(12) United States Patent
Heft

(10) Patent No.: US 11,724,328 B1
(45) Date of Patent: Aug. 15, 2023

(54) MULTI-FUEL ADAPTER TACTICAL SYSTEM

(71) Applicant: Brian Christopher Heft, Colorado Springs, CO (US)

(72) Inventor: Brian Christopher Heft, Colorado Springs, CO (US)

( * ) Notice: Subject to any disclaimer, the term of this patent is extended or adjusted under 35 U.S.C. 154(b) by 0 days.

(21) Appl. No.: 17/361,083

(22) Filed: Jun. 28, 2021

Related U.S. Application Data

(62) Division of application No. 14/701,221, filed on Apr. 30, 2015, now Pat. No. 11,045,890.

(60) Provisional application No. 61/986,854, filed on Apr. 30, 2014.

(51) Int. Cl.
  *B23K 7/00* (2006.01)
  *B23K 7/10* (2006.01)

(52) U.S. Cl.
  CPC .............. *B23K 7/002* (2013.01); *B23K 7/005* (2013.01); *B23K 7/10* (2013.01)

(58) Field of Classification Search
  CPC ........... B23K 7/002; B23K 7/10; B23K 7/005
  USPC ............ 266/48; 431/345, 346, 347; 228/256
  See application file for complete search history.

(56) References Cited

U.S. PATENT DOCUMENTS

| | | | |
|---|---|---|---|
| 1,773,418 A | | 8/1930 | Wilson et al. |
| 1,879,789 A | * | 9/1932 | Browning ............... F23D 91/02 431/233 |
| 1,991,638 A | * | 2/1935 | Sunderman ........... F23D 14/465 431/207 |
| 2,031,163 A | * | 2/1936 | Hughey ................... F23D 91/02 431/2 |
| 2,362,213 A | | 11/1944 | Miller et al. |
| 3,182,334 A | | 5/1965 | Hammon |
| 3,192,987 A | | 7/1965 | Hammon |
| 3,299,939 A | | 1/1967 | Marra |
| 3,604,632 A | * | 9/1971 | Eichelman .............. F23D 14/42 239/596 |
| 4,253,716 A | | 3/1981 | Turner, Jr. et al. |
| 4,439,249 A | | 3/1984 | Singh et al. |
| 4,951,722 A | | 8/1990 | Nitzberg et al. |
| 5,120,026 A | | 6/1992 | Bissonnette |
| 5,236,467 A | | 8/1993 | Fritz |
| 5,379,930 A | | 1/1995 | Liang |
| 5,407,348 A | * | 4/1995 | Mims ...................... F23D 14/42 137/454.2 |
| 6,063,329 A | | 5/2000 | Tsai |
| 6,726,471 B2 | | 4/2004 | Parkin et al. |
| 6,910,881 B2 | | 6/2005 | Parkin et al. |

(Continued)

FOREIGN PATENT DOCUMENTS

FR  2958371 A1  10/2011
JP  2006007230  *  1/2006  ............. B23K 7/005

OTHER PUBLICATIONS

Saez, "Adapter for Thermal Cutting Torch Oct. 2011," Abstract, pp. 1-2, Description pp. 1-5, Claims, 2011, pp. 1-2.

*Primary Examiner* — Jessee R Roe
*Assistant Examiner* — Michael Aboagye
(74) *Attorney, Agent, or Firm* — Messner Reeves LLP; Scott J. Hawranek

(57) ABSTRACT

A device and system comprising a cutting torch system including a multi-fuel adapter specially adapted to convert a gasoline oxygen cutting system to a multi-fuel cutting system and methods of using the same. The invention also includes a portable system including a carrying case for use with the multi-fuel adapter.

17 Claims, 22 Drawing Sheets

(56) References Cited

U.S. PATENT DOCUMENTS 6,979,422 B2   12/2005  Parkin et al.
11,045,890 B1 *  6/2021  Heft ...................... B23K 7/005

* cited by examiner

FIG. 2C SECTION A-A

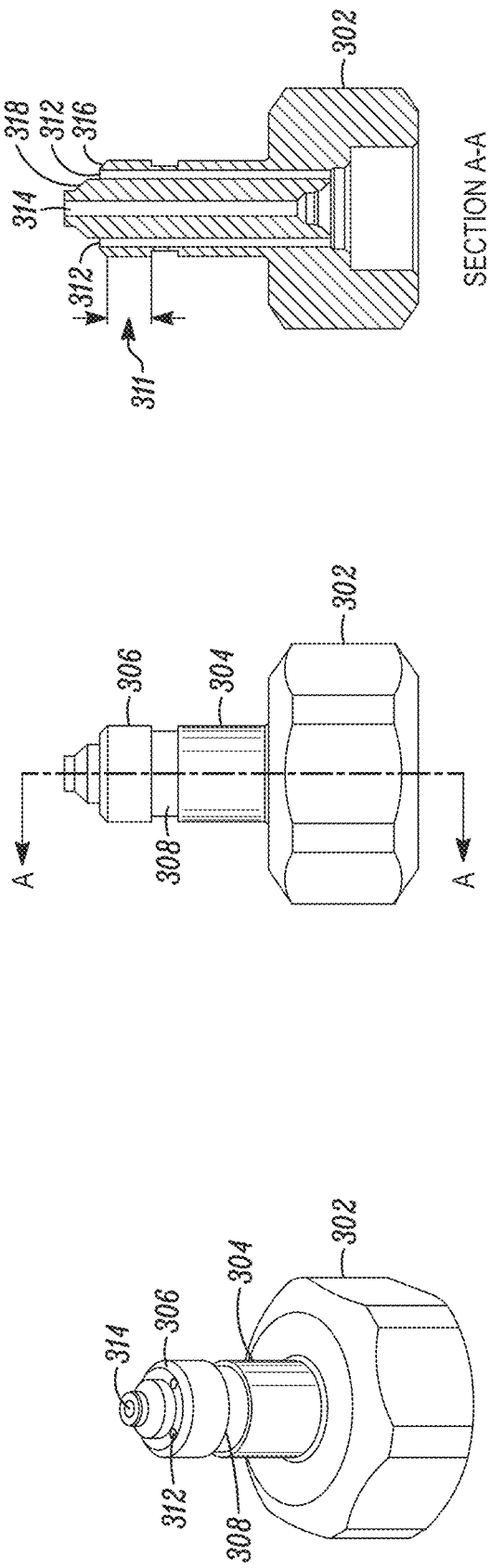
FIG. 3C
FIG. 3E
FIG. 3B
FIG. 3A
FIG. 3D

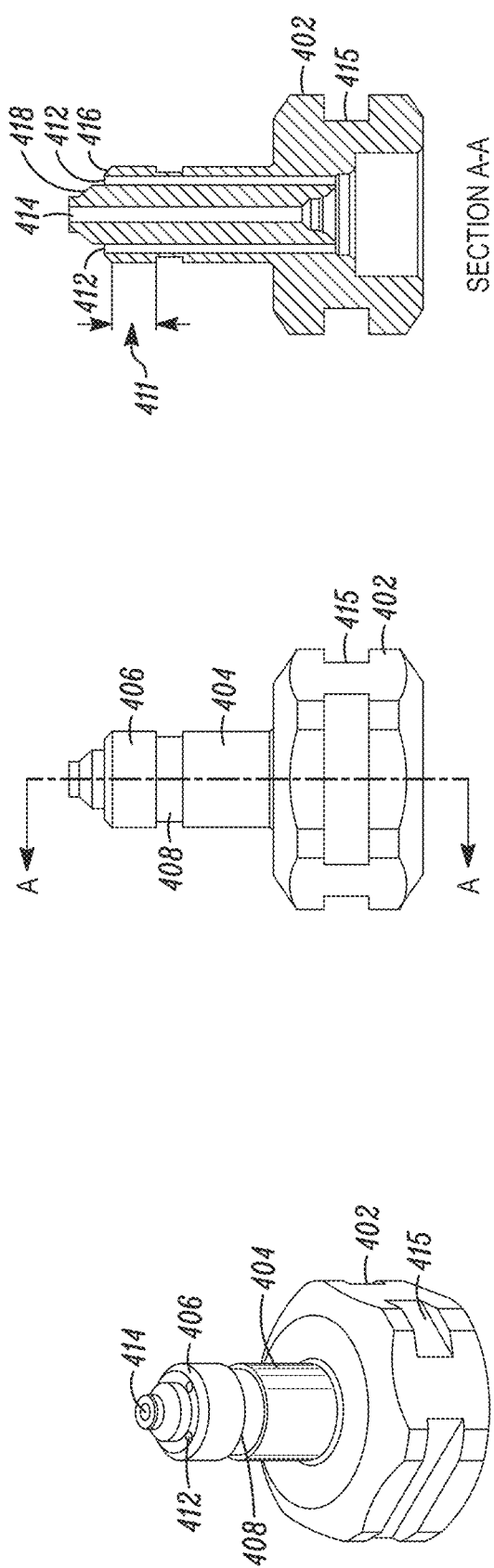
FIG. 4C
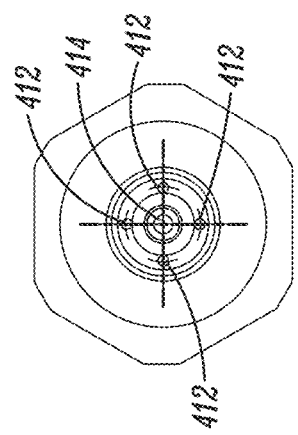
FIG. 4B
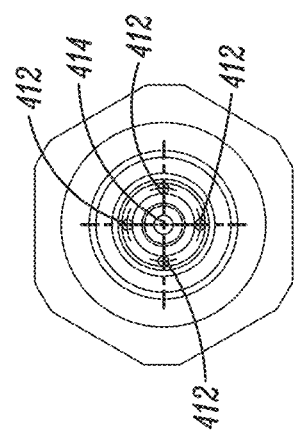
FIG. 4E
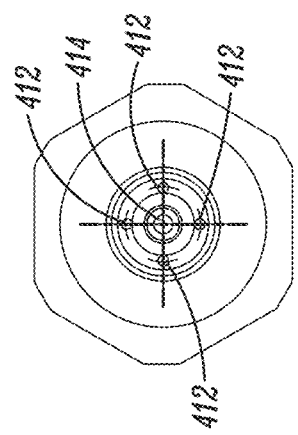
FIG. 4A
FIG. 4D

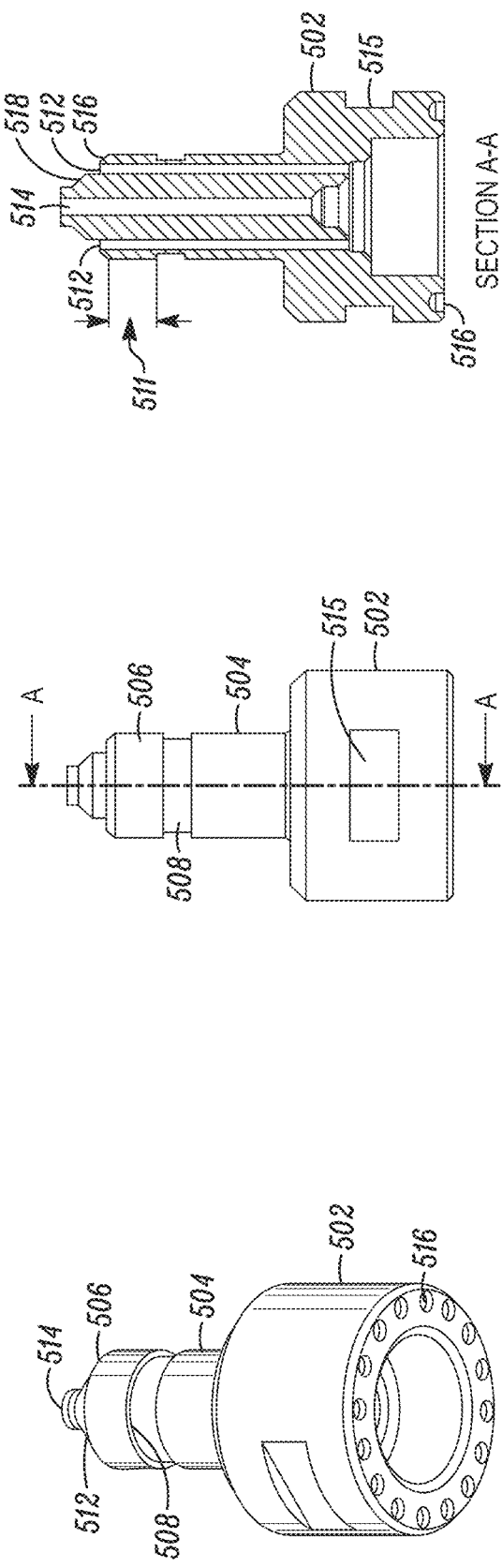
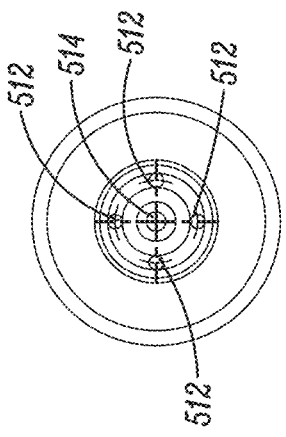
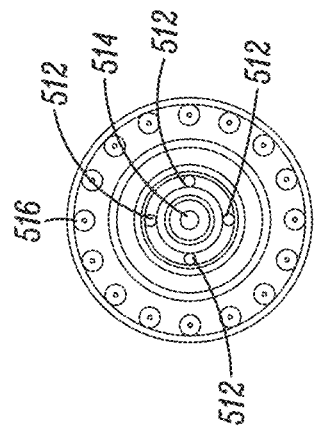
FIG. 5A
FIG. 5B
FIG. 5C
FIG. 5D
FIG. 5E

US 11,724,328 B1

MULTI-FUEL ADAPTER TACTICAL SYSTEM

The present application is a divisional of U.S. patent application Ser. No. 14/701,221 filed Apr. 30, 2015, Now U.S. Pat. No. 11,045,890 which claims the benefit of U.S. Provisional Patent Application No. 61/896,854 filed Apr. 30, 2014, each of these applications are hereby incorporated herein by reference for all purposes as if fully set herein.

BACKGROUND OF THE INVENTION

Field of the Invention

The present invention generally relates to a multi-fuel adapter for a cutting torch, and more particularly to a multi-fuel adapter, method of making and using the same. The invention also includes a portable system including a carrying case for use with the multi-fuel adapter.

SUMMARY OF THE INVENTION

Accordingly, the invention is directed to a multi-fuel adapter that substantially obviates one or more of the problems due to limitations and disadvantages of the related art.

An advantage of the invention is to provide a cutting torch that can be used with a number of fuels different from conventional gasoline, e.g., fuels such as heavy fuels including kerosene, diesel, bio-diesel, JP-5, JP-8, and JP-24, and combinations of the same.

Another advantage of the invention is a torch system that is rugged and ready to serve for decades.

Another advantage of the invention is a multi-fuel adapter kit configured to convert a conventional oxygen gasoline cutting system to a multi-fuel oxygen cutting system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a multi-fuel oxygen cutting system includes a cutting torch including a head, a body and a base, a multi-fuel adapter releasably attached to the cutting head, and a cutting tip releasably attached to the multi-fuel adapter.

In another aspect of the invention, multi-fuel adapter kit includes a multi-fuel adapter, a tip nut for the multi-fuel adapter, an installation wrench sized for the multi-fuel adapter, a cutting tip, a heavy fuel igniter including igniter flint cartridges, and a case.

In yet another aspect of the invention, a method of converting a conventional gasoline oxygen cutting torch to a multi-fuel cutting torch includes the step of obtaining a the conventional gasoline oxygen cutting torch, the step of attaching a multi-fuel adapter a head of the conventional gasoline oxygen cutting torch, and the step of attaching cutting tip to the multi-fuel adapter.

This Summary section is neither intended to be, nor should be, construed as being representative of the full extent and scope of the present disclosure. Additional benefits, features and embodiments of the present disclosure are set forth in the attached figures and in the description herein below, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2C illustrates an exemplary cross-sectional view of FIG. 2B along line A to A';

FIG. 3A illustrates an exemplary isometric view of a multi-fuel adapter according to another embodiment of the invention;

FIG. 3B illustrates an exemplary front view of the multi-fuel adapter according to FIG. 3A;

FIG. 3C illustrates an exemplary cross-sectional view of FIG. 3B along line A to A';

FIG. 3D illustrates an exemplary bottom view of the multi-fuel adapter according to FIG. 3A;

FIG. 3E illustrates an exemplary top view of the multi-fuel adapter according to FIG. 3A;

FIG. 4A illustrates an exemplary isometric view of a multi-fuel adapter according to another embodiment of the invention;

FIG. 4B illustrates an exemplary front view of the multi-fuel adapter according to FIG. 4A;

FIG. 4C illustrates an exemplary cross-sectional view of FIG. 4B along line A to A';

FIG. 4D illustrates an exemplary bottom view of the multi-fuel adapter according to FIG. 4A;

FIG. 4E illustrates an exemplary top view of the multi-fuel adapter according to FIG. 4A;

FIG. 5A illustrates an exemplary isometric view of a multi-fuel adapter according to yet another embodiment of the invention;

FIG. 5B illustrates an exemplary front view of the multi-fuel adapter according to FIG. 5A;

FIG. 5C illustrates an exemplary cross-sectional view of FIG. 5B along line A to A';

FIG. 5D illustrates an exemplary bottom view of the multi-fuel adapter according to FIG. 5A;

FIG. 5E illustrates an exemplary top view of the multi-fuel adapter according to FIG. 5A;

DETAILED DESCRIPTION OF THE ILLUSTRATED EMBODIMENTS

Figure 1A:
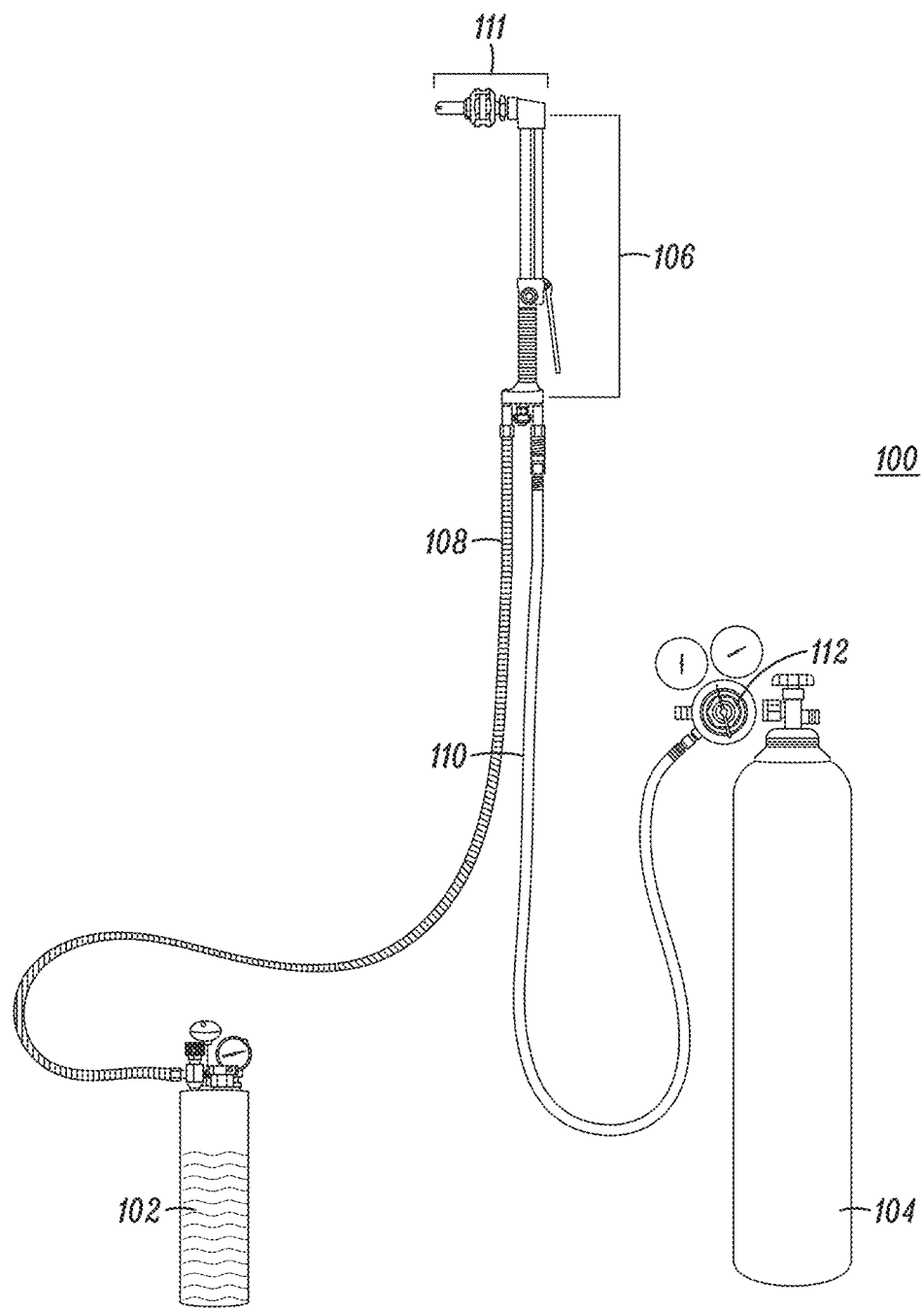
FIG. 1A illustrates an exemplary view of a cutting torch system according to an embodiment of the invention.

In order to more fully appreciate the present disclosure and to provide additional related features, the following references are incorporated herein by reference in their entirety:

U.S. Pat. No. 3,182,334 by Hammon, which discloses a cutting and welding torch.

U.S. Pat. No. 3,192,987 by Hammon, which discloses a cutting and welding torch.

U.S. Pat. No. 5,120,026 by Bissonnette, which discloses a fluid cooled cutting torch including a hollow handle, a torch butt assembly, a torch head, supply tubes for preheated gas, preheated oxygen and cutting oxygen and cooling fluid supply and drainage conduits. The torch head is adapted to interchangeably receive a premix or postmix cutting torch nozzle. The cooling supply conduit extends through the torch butt assembly and within the torch handle to a point adjacent to the torch head. The cooling system provides effective cooling of the torch head and even cooling of the torch handle. The torch is easily manufactured at low cost. The torch may be readily converted from a premix torch to a postmix torch.

U.S. Pat. No. 5,379,930 by Liang, which discloses a cutting torch specially adapted to a gasoline-oxygen cutting machine and a cutting machine provided with said torch. Said torch comprises a cutting torch body; a gasoline tube, a preheating oxygen tube and a cutting oxygen tube; a gasoline adjusting valve, a preheating oxygen adjusting valve and a cutting oxygen adjusting valve fitted to the cutting torch body; and a cutting head, said gasoline tube, said preheating oxygen tube and said cutting oxygen tube being communicated with a main oxygen tube and a main gasoline tube through the gasoline adjusting valve, the preheating oxygen adjusting valve and the cutting oxygen adjusting valve respectively, and further communicated with an oxygen bottle and an gasoline tank through the main oxygen tube and the main gasoline tube respectively, the other ends of said gasoline tube, said preheating oxygen tube and said cutting oxygen tube being communicated with the cutting head, wherein said cutting head comprises a cutting oxygen passage, at least one preheating oxygen passage, at least one gasoline passage and a combustion cover, said cutting oxygen passage being located at the center of the cutting head, said gasoline passage(s) being located at the outside of said cutting oxygen passage, and said preheating oxygen passage being located at the outmost side, said combustion cover being screwed on one end of the cutting head, and the other end of the cutting head being connected with the cutting torch body.

Reference will now be made in detail to an embodiment of the present invention, example of which is illustrated in the accompanying drawings.

In an embodiment of the invention, the cutting torch is configured with a multi-fuel adapter in order to adapt the cutting torch to operate with a volatile mixture of flammable liquid hydrocarbons derived chiefly from crude petroleum, e.g., gasoline, as its primary fuel. The system does not use acetylene. The multi-fuel adapter is configured to allow cutting torch operation with flammable liquid hydrocarbons such as diesel, kerosene, bio-diesel, mixed fuels and military fuels such as JP-5, JP-8, JP-24, combinations of the same and the like.

In one embodiment, the multi-fuel adapter transforms a gasoline cutting torch into a system which can then make cuts using a heavy fuel, e.g., diesel, biodiesel, kerosene, Jet-A, JP-8, JP-5 and JP-24. It is also backwards compatible with some systems, e.g., cutting systems described in U.S. Pat. Nos. 3,182,334 and 3,192,987 by Hammon, which are incorporated herein by reference. The efficient thermal coupler draws heat through the high heat tip to pre-heat the heavy fuels using just the return heat energy of the flame itself. The cutting systems described in U.S. Pat. Nos. 3,182,334 and 3,192,987 will not operate without standard gasoline that is they will not work with diesel, biodiesel, kerosene, Jet-A, JP-8, JP-5 and JP-24, therefore, the invention solves this problem and allows for a much more robust system.

A heavy fuel does not include gasoline, e.g., ethanol-free gasoline, regular gasoline and unleaded gasoline. At 15 degrees Celsius the density of ethanol-free gasoline is 0.74 kg/L; the density of JP-5, JP-8 or JP-24 is 0.78-0.82 kg/L; the density of kerosene is 0.81 kg/L; the density of diesel is 0.83 kg/L and the density of bio-diesel is 0.88 kg/L. The multi-fuel adapter works with heavy fuels having a density of 0.80 kg/L and greater and also with gasoline. However, the conventional oxygen-gasoline cutting systems, e.g., cutting systems described in U.S. Pat. Nos. 3,182,334; 3,192,987; and 5,379,930, will not operate with heavy fuels, e.g., gasoline or other fuels having a density of 0.80 kg/L and greater.

In one embodiment, the multi-fuel adapter includes a multi-fuel adapter with a tip nut, an installation wrench, one or more cutting tips, a heavy fuel igniter, igniter flint cartridges and a case. Alternatively, the kit simply includes one or fewer of these components, e.g., a multi-fuel adapter.

In one embodiment, the cutting torch system and multi-fuel adapters are sized to be portable and for military use or vehicle use, e.g., sized to fit in a hand carrier, backpack or the like.

In one embodiment, the cutting torch system eliminates the hazard of explosion from compressed gases when using cutting torches in various environments, e.g., industrial situations, military situations, and the like, by eliminating acetylene which is extremely dangerous. The system can also be stored and transported with no combustible materials present, e.g., by not filling the liquid fuel tank with fuel. The system can also be fueled directly before use and operates using stable fuels, e.g., military (JP) fuel with any of the multi-fuel adapters shown herein.

In addition, in one embodiment the system includes bullet proof or resistant materials, e.g., materials or a combination of materials configured to stop a bullet or similar high velocity projectiles, e.g., shrapnel. By way of example, the fuel tank, carrier, torch or combination of the same can include the bullet proofing materials.

In one embodiment, the system is designed to operate as an Oxy/fuel cutting torch, that is, it can be adapted to use exothermic cutting rods. The exothermic adapter replaces the cutting tip and allows perishable exothermic rods to be held in place while the oxygen system organic to the torch provides the oxygen control necessary for exothermic cutting operations. The cutting torch optionally includes a unique "clicker" system to aid operators in quickly adjusting the oxygen/fuel mixture. The clicker provides both physical and audible feedback to allow for "no light" adjustments. The system includes the a multi-fuel hose, designed to last 100 times longer than rubber hoses made from thermoplastic material. The multi-layer stainless steel hose provides an extremely durable exterior while the 100% Teflon interior allows any flammable liquid to be used without deterioration. The hose also eliminates fuel evaporation, greatly improving safety over rubber hoses.

The system includes a heavy fuel igniter which allows operators to light the torch when using heavy fuels like diesel and kerosene even in low temperatures. The components are contained in a shielded housing designed to protect the equipment from damage as well as to reduce the "misting" which can occur during a bullet or fragment strike. The outer shielding is designed to flex when struck, absorbing shock, as well as be easily replaced. All components of the system are configured to releasably attach and/or lock securely into the carrier.

In one embodiment, the carrier can include three releasable panels with an integral handle for ease of caring. The panels are constructed from one or more materials, e.g., aluminum, thermoplastic, alloy, metal, composites and combinations of the same. The panels may also be ballistic or bullet proof with metal plates and/or composite materials. The system includes a pressurizable tank, e.g., 0 psi to 50 psi or greater, preferably 10 psi to about 50 psi for operational pressures for the fuel. The tank is utilized for holding the fuel. The system does not include oxygen as it may be already present for military purposes. Optionally, the system may include a holder for holding an oxygen tank. The system further includes a cutting torch and a liquid transport tube for transporting the fluid to the cutting torch. The cutting torch includes a multi-fuel adapter as shown herein. The tank can be pressurized manually with a pump as shown or electronically with an electric compressor (not shown) and/or a combination of the same.

Reference will now be made in detail to an embodiment of the present invention, an example of which is illustrated in the accompanying drawings.

FIG. 1A illustrates an exemplary view of a cutting torch system according to an embodiment of the invention.

Referring to FIG. 1A, the cutting torch system is generally depicted as reference number 100. The system 100 includes a liquid fuel tank 102 configured to hold flammable liquid hydrocarbons, e.g., gasoline, an oxygen tank 104 configured to hold oxygen gas and a cutting torch 106. The oxygen tank 104 includes a regulator 112 coupled to the top of the tank 104. The oxygen tank 104 can be almost any size commercially available oxygen bottle configured to include liquid oxygen and oxygen manufactured using pressure swing adsorption (PSA). As known in the art oxygen manufactured through the PSA process has a lower purity oxygen than oxygen made in cryogenic plants. Although the cutting system will operate with lower purity oxygen it is expected that for every 1% reduction in purity, operators can expect a 4-5% reduction in overall performance. The cutting torch 106 is releasably coupled to a detachable multi-fuel hose 108 that is also releasably coupled to the liquid fuel tank 102. The cutting torch 106 is also releasably coupled to a detachable hose 110 configured to transport oxygen to the cutting torch that is also releasably coupled to the oxygen tank 104. In a preferred embodiment, the hose 110 has a 9/16 connection and comes in available lengths, e.g., from about 5 feet to about 100 feet or longer. The system also includes a cutting head assembly 111.

Figure 1B:
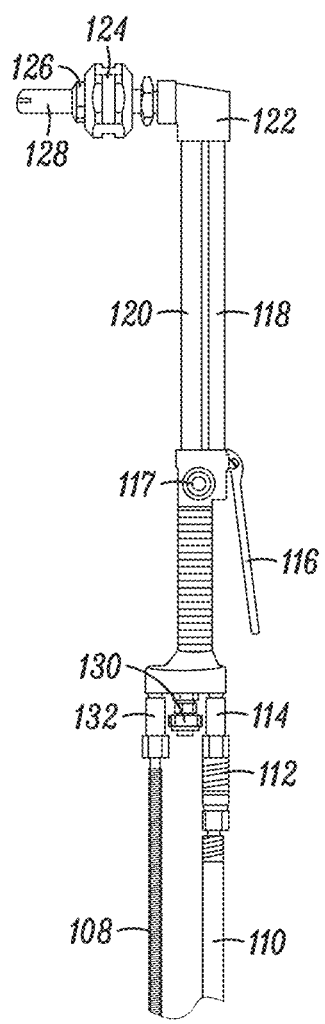
FIG. 1B illustrates an exemplary enlarged view of the cutting torch of FIG. 1A.

FIG. 1B illustrates an exemplary enlarged view of the cutting torch of FIG. 1A.

Referring to FIG. 1B, the cutting torch 106 includes an oxygen hose back flash arrester 112 coupled to the oxygen hose connector 114. The oxygen hose back flash arrester 112 is configured to prevent flashback through the oxygen hose 110. Using a flashback arrester is not a preplacement for manually purging the torch before each light-up. No additional fuel line flashback arrestor is required with this system as combustion is not possible with the absence of oxygen. The cutting torch 106 can be any conventional torch as known in the art, e.g., the torch as described in U.S. Pat. Nos. 3,182,334; 3,192,987; and 5,379,930, each of which is hereby incorporated by reference as if fully set forth herein. The cutting torch is a liquid fuel torch designed for use with liquid fuels, such as gasoline, and heavy fuels like diesel and kerosene when using the multi-fuel adapter 124. The cutting torch 106 can be configured in multiple lengths, e.g., 7, 15, 18, 20, 27, 36, 48, 60, and 72, and 84 inches. The cutting torch 106 is not compatible with compressed gasses. That is, the cutting torch 106 will not operate with compressed gasses, e.g., acetylene.

In this embodiment, the cutting torch 106 includes a high pressure oxygen trigger 116 and a pre-heat oxygen knob 117.

Depressing the oxygen trigger 116 permits the flow of oxygen from the oxygen tank 104 through a tube 118 through the head 122 and to the central opening of the multi-fuel adapter 124. The oxygen trigger 116 controls high pressure flow of cutting oxygen. The high pressure is in a range from about 6 psi to about 190 psi. The pre-heat oxygen knob 117 can be configured with a pre-determined click restrictor to allow a pre-determined volume of pre-heat oxygen to be delivered to the pre-heat flame.

The cutting torch 106 also includes a multi-fuel hose 108 coupled to a fuel hose connector 132 that releasably attaches the multi-fuel hose 108 to the cutting torch 106. The liquid hose connector 132 is the point of the attachment for the fuel hose 108. In a preferred embodiment, the connection is a reverse thread count (counter clockwise tightening) and marked with a notch. The multi-fuel hose 108 is configured for use with liquid fuels as described herein, e.g., gasoline, diesel, kerosene and the like. The interior of the fuel hose includes a thermoplastic material, e.g., polytetrafluoroethylene (PTFE), configured to prevent damage from long term exposure to petroleum. The multi-fuel hose 134 cannot be used with compressed gases. The multi-fuel hose 108 comes in variable length from about 5 ft to about 100 feet or longer. The fuel control knob 130 controls the volume of fuel from the liquid fuel tank 102 into the preheat flame. The knob 130 controls a valve (not shown), which controls the fuel through the tube 120 and into the multi-fuel adapter 124. A cutting tip 128 is coupled to the multi-fuel adapter 124 with a tip nut 126 and can come in various sizes, e.g., 0, 1, 2, 3, 4, 5, 6, 7, L "Rosebud", 81, and 83. The tip nut 126 secures the cutting tip to the torch head. The angle of the head 122 is shown as a ninety degree angle. In other embodiments, other angles may be used, e.g., from about 25 degrees to about 180 degrees. In a preferred embodiment, the angles are about 75 degrees, 90 degrees (as shown) and 180 degrees.

Figure 1C:
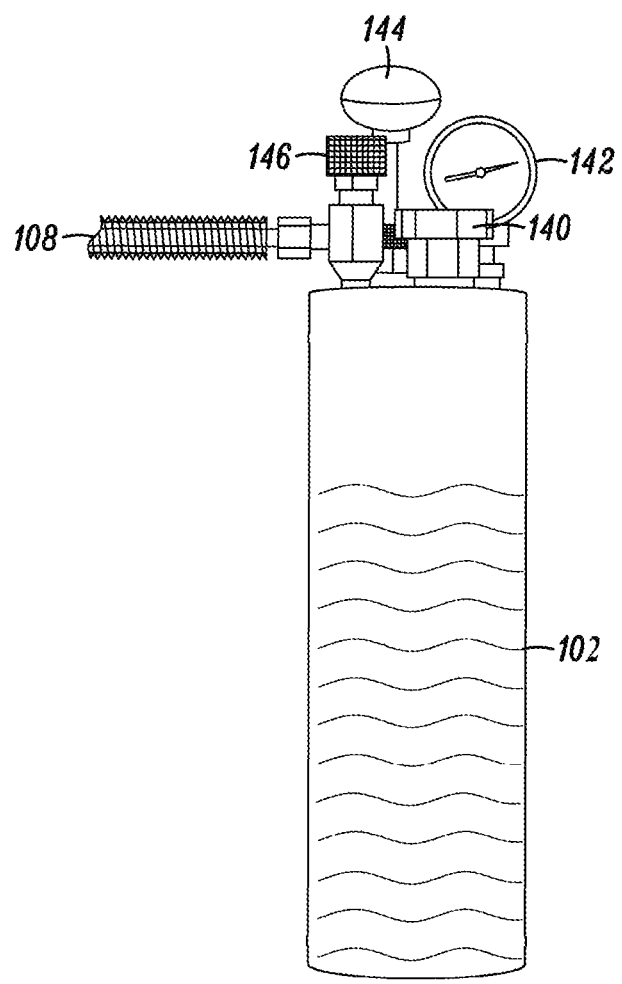
FIG. 1C illustrates an exemplary enlarged view of the fuel tank of the cutting torch system of FIG. 1A.

FIG. 1C illustrates an exemplary enlarged view of the fuel tank of the cutting torch system of FIG. 1A.

The fuel tank 102 is configured to hold the multi-fuel which is a volatile mixture of flammable liquid hydrocarbons, e.g., any grade of gasoline, "white" gas, camping fuel, Jet-A, diesel, kerosene, bio-diesel, mixed fuels and military fuels such as JP-5, JP-8, JP-24, combinations of the same and the like. The tank can be single walled, double walled or more than two walls. The tank 102 is constructed from metal material. In a preferred embodiment, the tank is constructed from carbon steel material. The tank 102 may also be reinforced with bullet resistance material herein. The tank 102 is configured with several safety features and includes a removable filler cap 140, a pressure gauge 142, a pump 144, and a fuel valve 146. The fuel valve 146 is configured as a shut-off valve for controlling the flow of fuel exiting the tank. The removable filler cap 140 seals the tank fill port and includes a pressure relief valve, e.g., 35 psi, 50, psi or 100 psi. The pump 144 is configured in this embodiment to be a manual hand pump used to pressure the tank, but may be electric and provides pressure to the tank 102. The filler cap 140 is configured to be removable to allow for filling and removable of liquid fuel. The tank may have any volume and in preferred embodiment the tank volume is a range from about 0.5 quart to about 2.5 gallons, and more preferred embodiment there are various tank sizes, such as, a 0.5 quart tank, 1 quart tank, 1.5 quart tank, 1 gallon tank, 1.5 gallon tank, 2 gallon tank and 2.5 gallon tank. In a preferred embodiment, the standard operating pressure is about 20 psi. In operation the tank should be re-pressurized to about 10 psi. Optionally, the tank includes a fill line to indicate the preferred filling capacity.

Figure 1D:
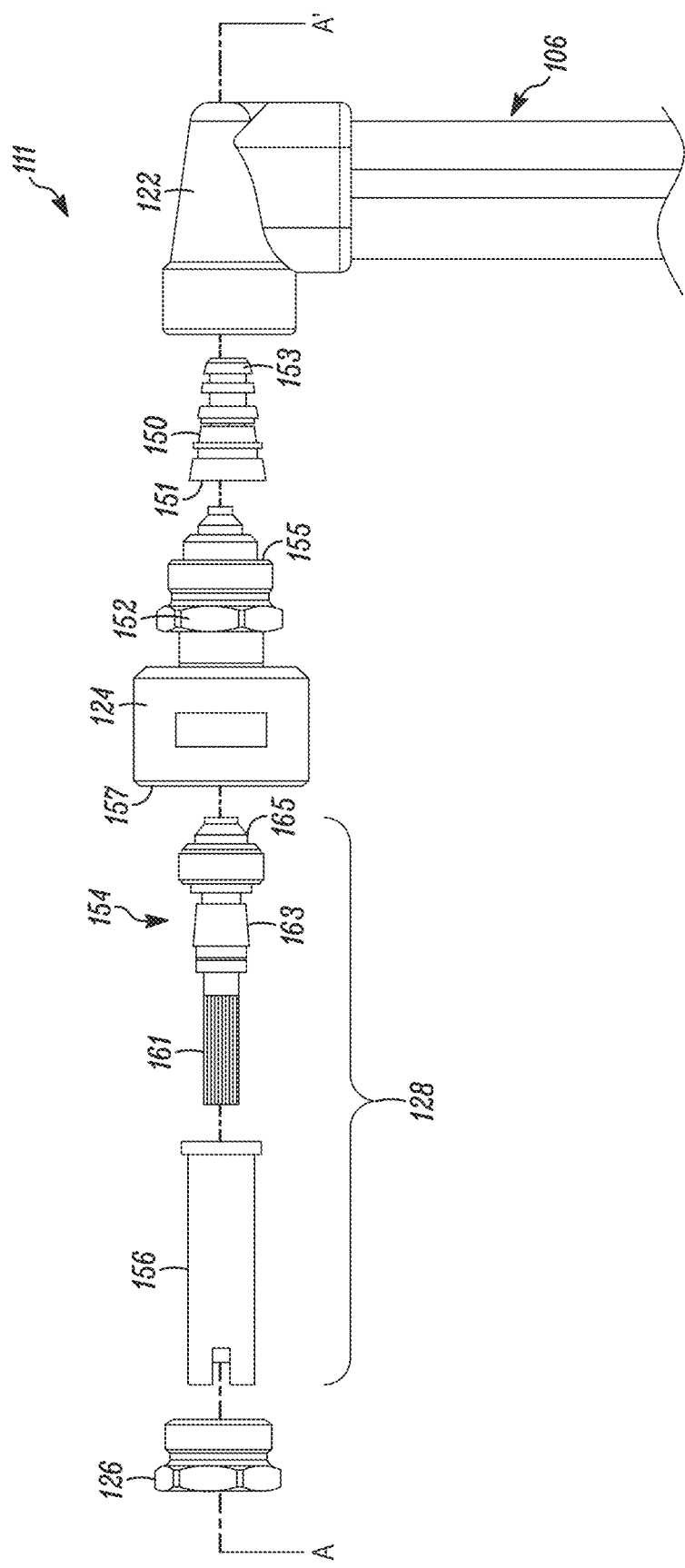
FIG. 1D illustrates an exemplary exploded view of the cutting head assembly of the cutting torch of FIG. 1B.
Figure 1E:
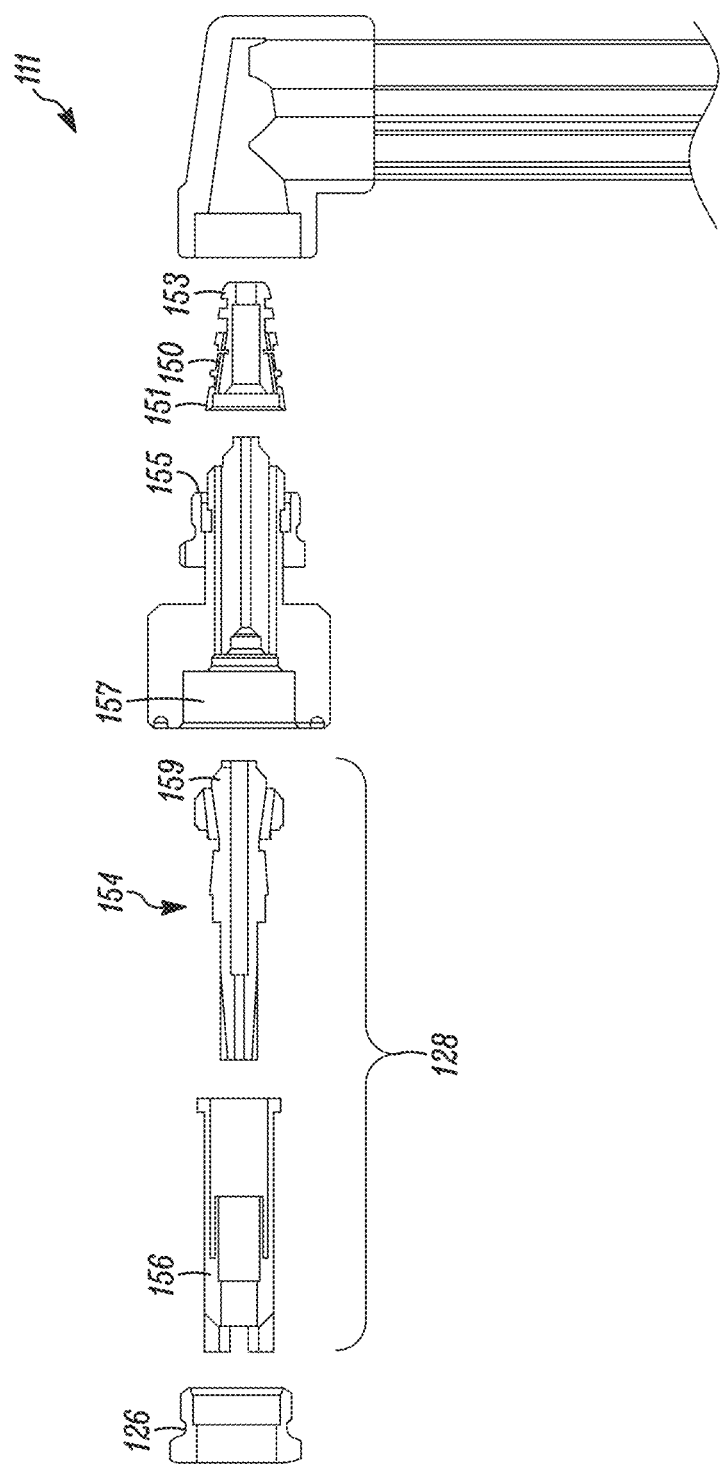
FIG. 1E illustrates an exemplary exploded cross-sectional view of the cutting head assembly of the cutting torch of FIG. 1D along line A to A'.

FIG. 1D illustrates an exemplary exploded view of the cutting head assembly of the cutting torch of FIG. 1B. FIG. 1E illustrates an exemplary exploded cross-sectional view of the cutting head assembly of the cutting torch of FIG. 1B along line A to A'.

Referring to FIGS. 1D-1E, the cutting head assembly 111 includes a head 122 of the cutting torch, a mixer body 150, a multi-fuel adapter 124 with an attachment nut 152, a sealing ring (not shown), cutting tip interior assembly or tip core 154 and exterior assembly or tip shell 156 and cutting tip nut 126. The attachment nut 152 has a set of threads for engaging threads in the cutting head 122. As shown, the pieces fit together in a male/female orientation. The mixing body 150 has female adapter side 151 configured to receive the male adapter side 155 of the multi-fuel adapter 124 and the mixing body has a male adapter side 153 configured to be received by the head 122 of the cutting torch. The tip 128 includes a tip shell 156 and a tip core 154. The tip shell is made an alloy, e.g., tellurium copper. The top The tip core is made of an alloy material, e.g., brass such as navel brass. In one embodiment, there is also a stainless steel interior sleeve. The tip core 154 includes a shell bore 163 and flutes 161 and a male seating surface 165. The male seating surface 165, which includes preheat supply channels and a high pressure oxygen supply channel. The multi-fuel adapter 124 includes the male adapter side 155 configured to fit within the female adapter side 151 of the mixing body and a female adapter side 157 configured to receive the male seating surface 165 of the tip core 154. The overall configuration is held in place by the multi-fuel adapter nut 152 and tip nut 126.

Figure 1G:
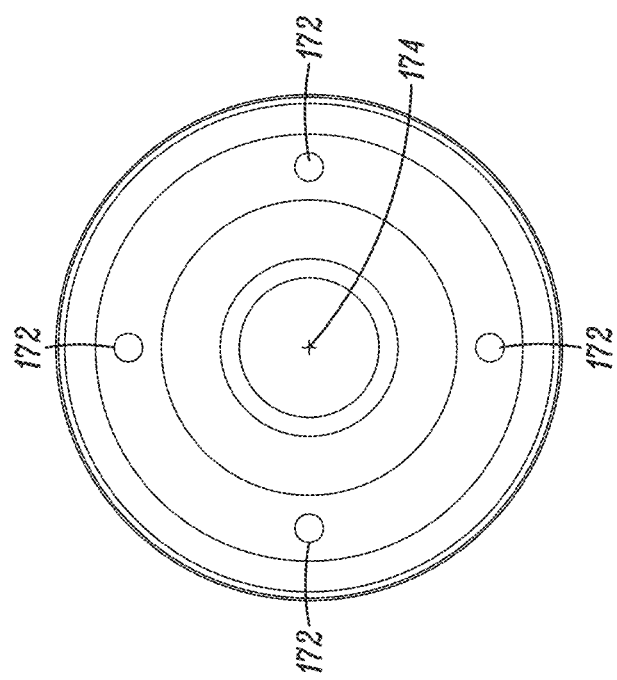
FIG. 1G illustrates a first end view of the mixer body of FIG. 1E.
Figure 1F:
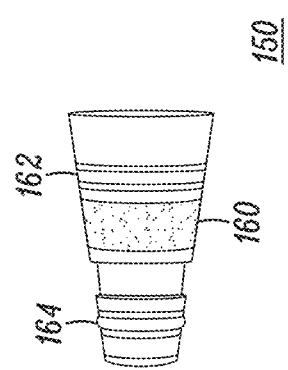
FIG. 1F illustrates an enlarged exemplary view of the mixer body.

FIG. 1F illustrates an enlarged view of the mixer body. Referring to FIG. 1F, the mixer body 150 includes a wick material 160, a first set of o-rings 162, and a second set of o-rings 164. The wick material includes a material configured to distribute the liquid fuel substantially evenly around a circumference of the mixer so that it is evenly received in the mixer to achieve a balanced preheat flame. In a preferred embodiment, the material includes a sintered alloy, e.g., a sintered bronze. The first set of o-rings and second set of o-rings include a thermoplastic material and are configured to provide a liquid seal in the cutting head 122. The mixer body 150 snugly fits inside the head 122 of the cutting torch 106. The mixer body is configured to mix oxygen and liquid fuel to supply the pre-heat flame.

Figure 1H:
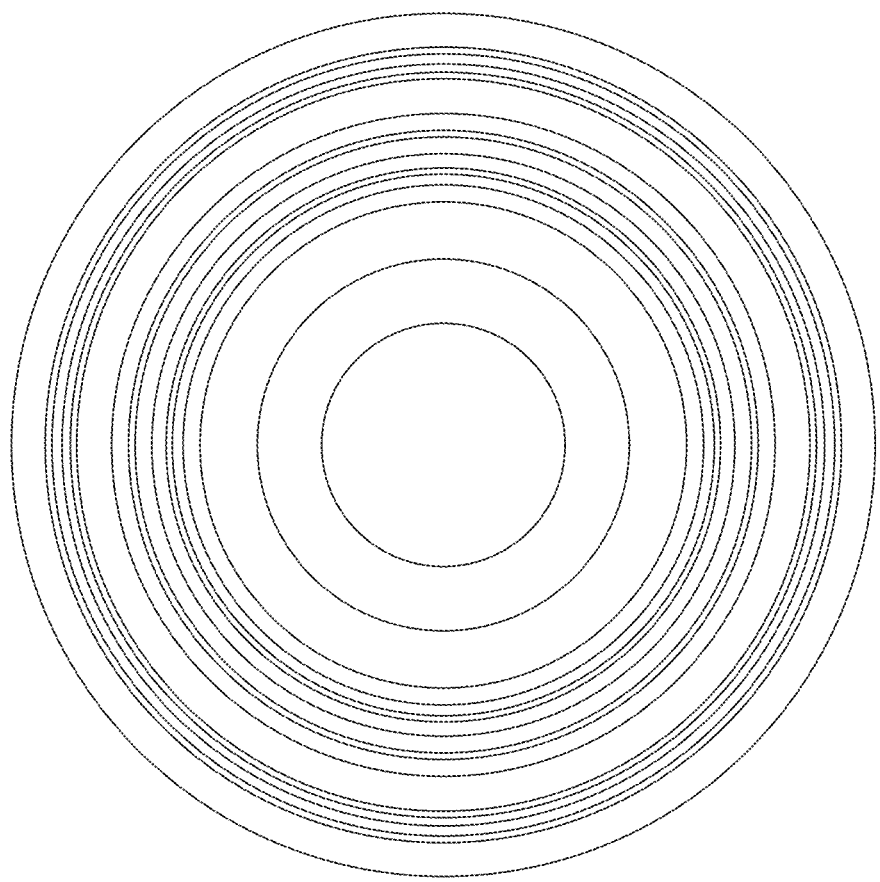
FIG. 1H illustrates a second end view the mixer body of FIG. 1E.

FIG. 1G illustrates a first end view of the mixer body of FIG. 1F. FIG. 1H illustrates a second end view of the mixer body of FIG. 1F. Referring to FIG. 1G, the female adapter side is formed in a tapered configuration and has four equally spaced orifices 172 to receive the pre-heat fuel mixture and a high pressure oxygen channel 174. Referring to FIG. 1H, the mixer is shown as an end view in a tapered configuration.

Figure 2B:
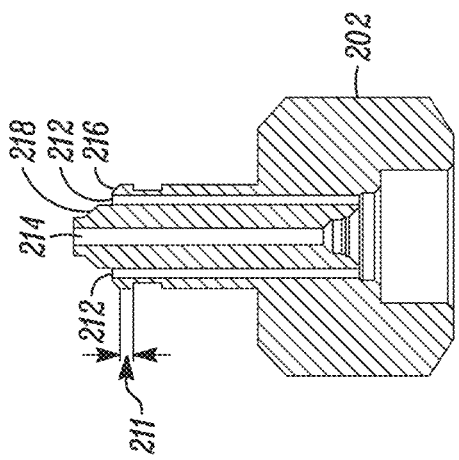
FIG. 2B illustrates an exemplary front view of the multi-fuel adapter according to FIG. 2A.
Figure 2B:
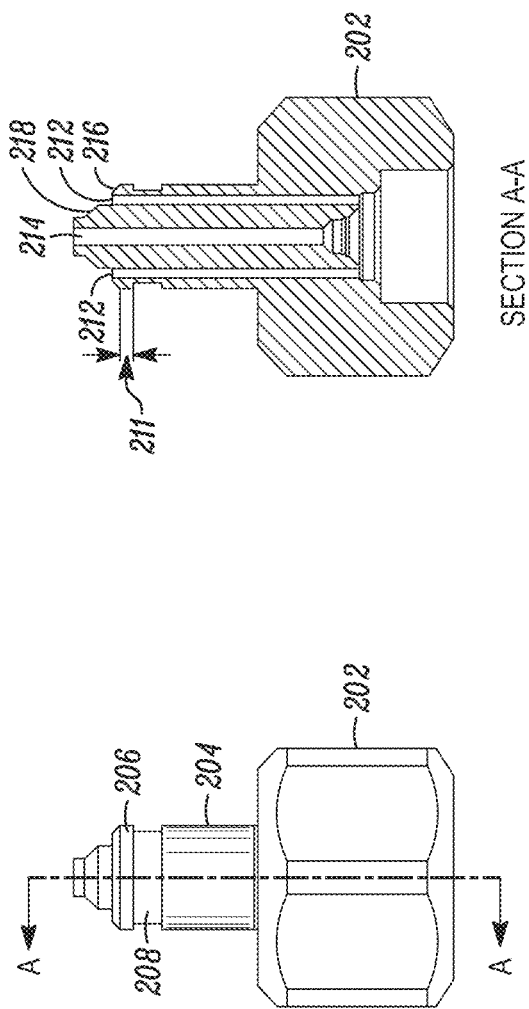
Figure 2E:
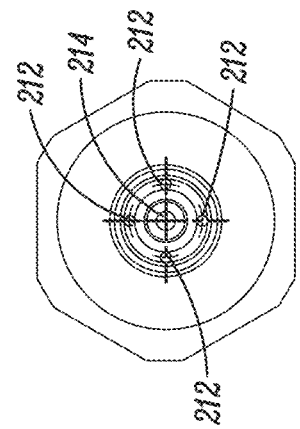
FIG. 2E illustrates an exemplary top view of the multi-fuel adapter according to FIG. 2A.
Figure 2A:
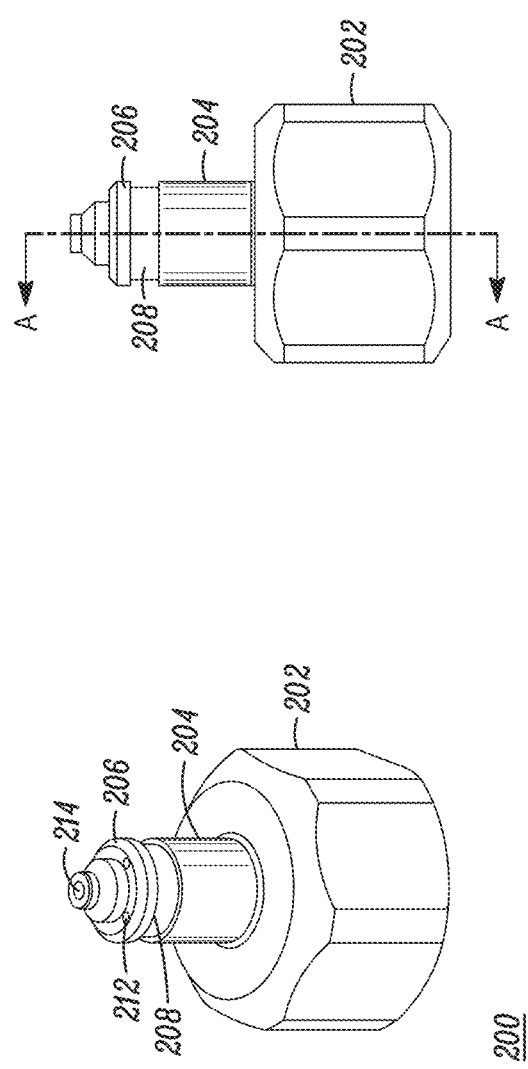
FIG. 2A illustrates an exemplary isometric view of a multi-fuel adapter according to an embodiment of the invention.
Figure 2D:
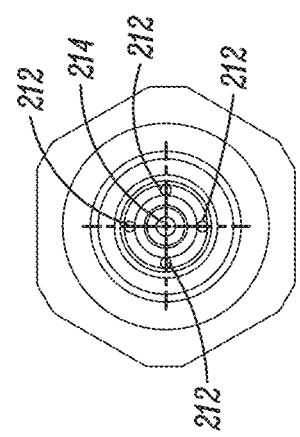
FIG. 2D illustrates an exemplary bottom view of the multi-fuel adapter according to FIG. 2A.

FIG. 2A illustrates an exemplary isometric view of a multi-fuel adapter according to an embodiment of the invention. FIG. 2B illustrates an exemplary front view of the multi-fuel adapter according to FIG. 2A. FIG. 2C illustrates an exemplary cross-sectional view of FIG. 2B along line A to A'. FIG. 2D illustrates an exemplary bottom view of the multi-fuel adapter according to FIG. 2A. FIG. 2E illustrates an exemplary top view of the multi-fuel adapter according to FIG. 2A.

Referring to FIG. 2A-2E, the multi-fuel adapter is generally depicted with reference to 200. The multi-fuel adapter 200 is utilized to convert the cutting torch system 100 or other cutting torch systems, e.g., cutting torch systems described in U.S. Pat. Nos. 3,182,334; 3,192,987; and 5,379, 930, each of which are hereby incorporated by reference as if fully set forth herein, to be operable with any type of liquid fuel as described herein.

The multi-fuel adapter 200 includes a main body 202, neck 204 and head 206. The main body 202, neck 204 and head 206 includes brass material, e.g., 360 brass. The main body mass is configured as an efficient thermal coupler to draw heat through the cutting tip to pre-heat the multi-fuel using only return heat energy of a flame during operation of the cutting system. The large mass of the main body 202, thereby allows the multi-fuel adapter to remain heated with a pre-heat flame only.

A recess 208 is formed on the neck portion 204 and configured to receive a split ring (not shown), e.g., a 360 brass split ring. The split ring (not shown) can be formed as a c-ring and is configured to prevent a sealing nut (not shown) from falling off the neck 204. The sealing nut 152 is used to pull the neck by putting pressure on the split ring into the cutting head 122, thereby securing the multi-fuel adapter 200 to the cutting head 122. In one embodiment, there is a large amount of force required to secure the multi-fuel adapter 200 to the cutting head 122. The amount of force is in a range from about 3000 psi to about 5200 psi or greater; in a preferred embodiment there is about 4500 psi.

Four equally spaced ports or orifices 212 are arranged in the tip portion. Each port 212 extends as a channel via a lumen from the tip 206 through the neck 204 and main body 202. The neck 204 extends from the upper most portion of the main body 202 to the bottom of the recess 208. As the length of the neck 204 is increased the mixing time of multi-fuel to oxygen is also increased, thereby improving performance. The lumens are configured in a circular geometrical configuration. The lumens are configured in fluid communication with the orifices on the cutting tip (not shown) and in fluid communication with orifices on a cutting torch head 122. The lumens are used to provide a oxy fuel pre-heat fuel mixture. A channel 214 is used a high pressure oxygen channel and extends via a lumen from the tip 206 through the neck 204 and main body 202.

An end portion of the tip 206 includes a first taper region 216 and second taper region 218 configured as a male adapter. This first taper region 216 and second taper region 218 are configured to fit into a substantially mirror image of a female adapter mixing body 151 that is arranged in the cutting torch head 122. In this embodiment, the recess 208 is spaced a small distance 211 from the end of the first taper region 216; the distance 211 is about 0.09 inches.

FIG. 3A illustrates an exemplary isometric view of a multi-fuel adapter according to another embodiment of the invention. FIG. 3B illustrates an exemplary front view of the multi-fuel adapter according to FIG. 3A. FIG. 3C illustrates an exemplary cross-sectional view of FIG. 3B along line A to A'. FIG. 3D illustrates an exemplary bottom view of the multi-fuel adapter according to FIG. 3A. FIG. 3E illustrates an exemplary top view of the multi-fuel adapter according to FIG. 3A.

Referring to FIG. 3A-3E, the multi-fuel adapter is generally depicted with reference to 300. The multi-fuel adapter 300 is utilized to convert the cutting torch system 100 or other cutting torch systems, e.g., cutting torch systems described in U.S. Pat. Nos. 3,182,334; 3,192,987; and 5,379, 930, each of which are hereby incorporated by reference as if fully set forth herein, to be operable with any type of liquid fuel as described herein.

The multi-fuel adapter 300 includes a main body 302, neck 304 and head 306. The main body 302, neck 304 and head 306 includes brass material, e.g., 360 brass. The main body mass is configured as an efficient thermal coupler to draw heat through the cutting tip to pre-heat the multi-fuel using only return heat energy of a flame during operation of the cutting system. The large mass of the main body 302 thereby allows the multi-fuel adapter to remain heated with a pre-heat flame only.

A recess 308 is formed on neck portion 304 and configured to receive a split ring (not shown), e.g., a stainless steel ring. The split ring (not shown) can be formed as a c-ring and is configured to prevent a sealing nut (not shown) from falling off the neck 304. The sealing nut 152 is used to pull the neck via the sealing ring into the cutting head 122, thereby securing the multi-fuel adapter 300 to the cutting head 122. In one embodiment, there is a large amount of force required to secure the multi-fuel adapter 200 to the cutting head 122. The amount of force is in a range from about 3000 psi to about 5200 psi or greater; in a preferred embodiment there is about 4500 psi.

Four equally spaced ports or orifices 312 are arranged in the tip portion. Each port 312 extends as a channel via a lumen from the tip 306 through the neck 304 and main body 302. The lumens are configured in a circular geometrical configuration. The lumens are configured in fluid communication with the orifices on the cutting tip (not shown) and in fluid communication with orifices on a cutting torch head 122. The lumens are used to provide a oxy fuel pre-heat fuel mixture. A channel 314 is used a high pressure oxygen channel and extends via a lumen from the tip 306 through the neck 304 and main body 502.

An end portion of the tip 306 includes a first taper region 316 and second taper region 318 configured as a male adapter. This first taper region 316 and second taper region 318 are configured to fit into a substantially mirror image of a female adapter mixing body 151 that is arranged in the cutting torch head 122. In this embodiment, the recess 308 is spaced a distance from the end of the first taper region 316; the distance 311 is about 0.32 inches. As compared to distance 211 this distance 311 is about three times larger and it is believed that this increased distance allows the nut to provide all the necessary force to seal the multi-fuel adapter face and the mixing body without distortion of the seating or sealing surfaces. The main body 302 has a mass less than the mass of the main body 202 of FIG. 2A.

FIG. 4A illustrates an exemplary isometric view of a multi-fuel adapter according to another embodiment of the invention. FIG. 4B illustrates an exemplary front view of the multi-fuel adapter according to FIG. 4A. FIG. 4C illustrates an exemplary cross-sectional view of FIG. 4B along line A to A'. FIG. 4D illustrates an exemplary bottom view of the multi-fuel adapter according to FIG. 4A. FIG. 4E illustrates an exemplary top view of the multi-fuel adapter according to FIG. 4A.

Referring to FIG. 4A-4E, the multi-fuel adapter is generally depicted with reference to 400. The multi-fuel adapter 400 is utilized to convert the cutting torch system 100 or other cutting torch systems, e.g., cutting torch systems described in U.S. Pat. Nos. 3,182,334; 3,192,987; and 5,379, 930, each of which are hereby incorporated by reference as if fully set forth herein, to be operable with any type of liquid fuel as described herein.

The multi-fuel adapter 400 includes a main body 402, neck 404 and head 406. The main body 402, neck 404 and head 406 include brass material, e.g., 360 brass. The main body mass is configured as an efficient thermal coupler to draw heat through the cutting tip to pre-heat the multi-fuel using only return heat energy of a flame during operation of the cutting system. The large mass of the main body 402 thereby allows the multi-fuel adapter to remain heated with a pre-heat flame only.

A recess 408 is formed on neck portion 404 and configured to receive a split ring (not shown), e.g., a stainless steel ring. The split ring (not shown) can be formed as a c-ring and is configured to prevent a sealing nut (not shown) from falling off the neck 404. The sealing nut 152 is used to pull the neck into the cutting head 122, thereby securing the multi-fuel adapter 400 to the cutting head 122. In one embodiment, there is a large amount of force required to secure the multi-fuel adapter 400 to the cutting head 122. The amount of force is in a range from about 3000 psi to about 5200 psi or greater; in a preferred embodiment there is about 4500 psi.

Four equally spaced ports or orifices 412 are arranged in the tip portion. Each port 412 extends as channel via a lumen from the tip 406 through the neck 404 and main body 402. The neck 404 extends from upper most portion of the main body 402 to the bottom of the recess 408. As the length of the neck 404 increases the mixing time of multi-fuel to oxygen is also increased, thereby improving performance. The lumens are configured in a circular geometrical configuration. The lumens are configured in fluid communication with the orifices on the cutting tip (not shown) and in fluid communication with orifices on a cutting torch head 122. The lumens are used to provide a oxy fuel pre-heat fuel mixture. A channel 414 is used a high pressure oxygen channel and extends via a lumen from the tip 406 through the neck 404 and main body 402.

An end portion of the tip 406 includes a first taper region 416 and second taper region 418 configured as a male adapter. This first taper region 416 and second taper region 418 are configured to fit into a substantially mirror image of a female adapter mixing body 151 that is arranged in the cutting torch head 122. In this embodiment, the recess 308 is spaced a distance 411 from the end of the first taper region; 416 the distance is about 0.32 inches. This distance 411 is about three times longer than the distance 211 of the multi-fuel adapter 200. This increase in distance it is believed to allow the nut to provide all the necessary force to seal the multi-fuel adapter face and the mixing body without distortion of the seating or sealing surfaces. The main body 402 has a mass less than the mass of the main body 302 of FIG. 3A. In this embodiment, there is a recess 415 in the main body 402. The recess 415 is configured to receive a wrench for tightening the multi-fuel adapter 400 and cutting tip nut as described herein.

FIG. 5A illustrates an exemplary isometric view of a multi-fuel adapter according to an embodiment of the invention. FIG. 5B illustrates an exemplary front view of the multi-fuel adapter according to FIG. 5A. FIG. 5C illustrates an exemplary cross-sectional view of FIG. 5B along line A to A'. FIG. 5D illustrates an exemplary bottom view of the multi-fuel adapter according to FIG. 5A. FIG. 5E illustrates an exemplary top view of the multi-fuel adapter according to FIG. 5A.

Referring to FIG. 5A-5E, the multi-fuel adapter is generally depicted with reference to 500. The multi-fuel adapter 500 is utilized to convert the cutting torch system 100 or other cutting torch systems, e.g., cutting torch systems described in U.S. Pat. Nos. 3,182,334; 3,192,987; and 5,379,930, each of which are hereby incorporated by reference as if fully set forth herein, to be operable with any type of liquid fuel as described herein.

The multi-fuel adapter 500 includes a main body 502, neck 504 and head 506. The main body 502, neck 504 and head 506 include a brass material, e.g., 360 brass. The main body mass is configured as an efficient thermal coupler to draw heat through the cutting tip to pre-heat the multi-fuel using only return heat energy of a flame during operation of the cutting system. In this embodiment, the main body 502 further includes a heat catch feature 506 configured to increase the rate of heat transfer from the pre-heat flame to the multi-fuel adapter. The heat catch feature may include one or more heat catch features, e.g., a series of equally spaced concentric holes around a bottom surface of the multi-fuel adapter 500. The holes may be about 0.01 inches deep to about 0.3 inches deep. Other geometric configurations and/or materials may also be used as the heat catch features, e.g., square configuration, a concentric slot extending in a range from about 5 degrees around the surface to 360 degrees around the surface, etc. In this embodiment, the main body 502 has a mass less than the main body 202, main body 302 or main body 402.

A recess 508 is formed on neck portion 404 and configured to receive a split ring (not shown), e.g., a stainless steel ring. The split ring (not shown) can be formed as a c-ring and is configured to prevent a sealing nut (not shown) from falling off the neck 504. The sealing nut 152 is used to pull the neck into the cutting head 122, thereby securing the multi-fuel adapter 500 to the cutting head 122. In one embodiment, there is a large amount of force required to secure the multi-fuel adapter 500 to the cutting head 122. The amount of force is in a range from about 3000 psi to about 5200 psi or greater; in a preferred embodiment there is about 4500 psi.

Four equally spaced ports or orifices 512 are arranged in the tip portion. Each port 512 extends as a channel via a lumen from the tip 506 through the neck 504 and main body 502. The neck 504 extends from the upper most portion of the main body 502 to the bottom of the recess 508. As the length of the neck 504 increases the mixing time of multi-fuel to oxygen is also increased, thereby improving performance. The lumens are configured in a circular geometrical configuration. The lumens are configured in fluid communication with the orifices on the cutting tip (not shown) and are in fluid communication with orifices on a cutting torch head 122. The lumens are used to provide a oxy fuel pre-heat fuel mixture. A channel 514 is used a high pressure oxygen channel and extends via a lumen from the tip 506 through the neck 504 and main body 502.

An end portion of the tip 506 includes a first taper region 516 and second taper region 518 configured as a male adapter. This first taper region 516 and second taper region 518 are configured to fit into a substantially mirror image of a female adapter mixing body 151 that is arranged in the cutting torch head 122. In this embodiment, the recess 508 is spaced a distance 511 from the end of the first taper region 516; the distance is about 0.32 inches. This distance 511 is about three times longer than the distance 211 of the multi-fuel adapter 200. This increase in distance is believed to allow the nut to provide all the necessary force to seal the multi-fuel adapter face and the mixing body without distortion of the seating or sealing surfaces. The main body 502 has a mass less than the mass of the main body 202, main body 302, and main body 402. In this embodiment, there is a recess 515 in the main body 502. The recess 515 is configured to receive a wrench for tightening the multi-fuel adapter 500 and cutting tip nut as described herein.

Figure 6C:
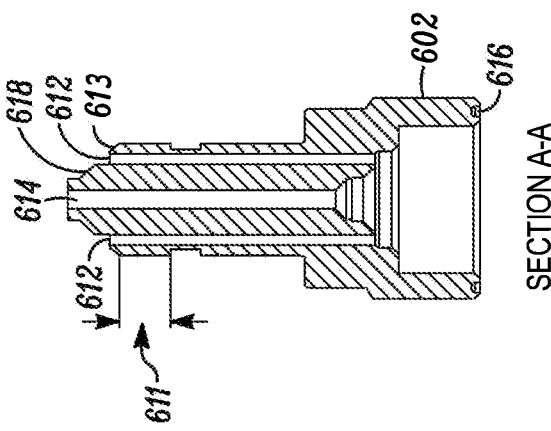
FIG. 6C illustrates an exemplary cross-sectional view of FIG. 6B along line A to A'.
Figure 6B:
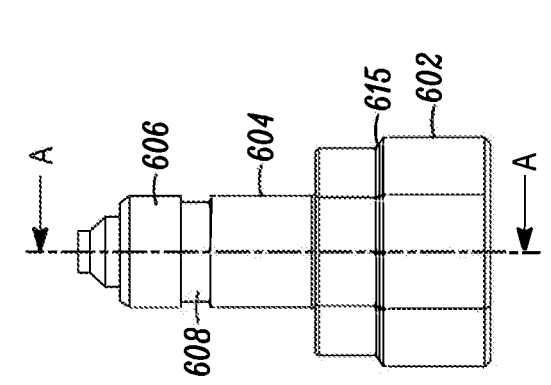
FIG. 6B illustrates an exemplary front view of the multi-fuel adapter according to FIG. 6A.
Figure 6A:
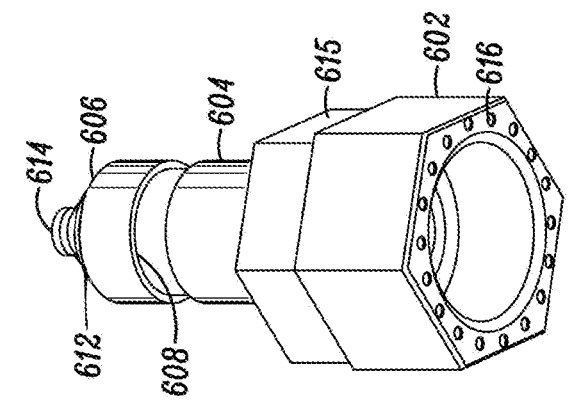
FIG. 6A illustrates an exemplary isometric view of a multi-fuel adapter according to another embodiment of the invention.
Figure 6E:
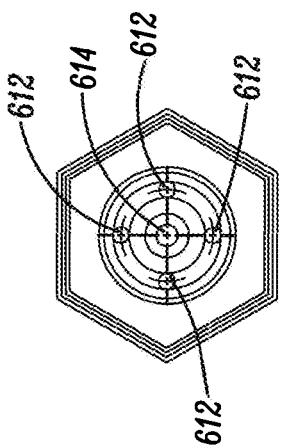
FIG. 6E illustrates an exemplary top view of the multi-fuel adapter according to FIG. 6A.
Figure 6D:
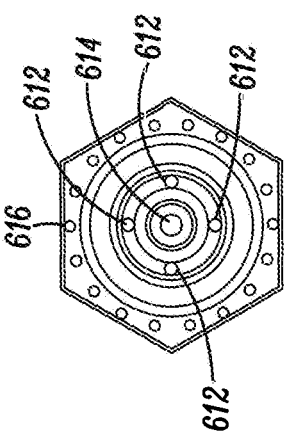
FIG. 6D illustrates an exemplary bottom view of the multi-fuel adapter according to FIG. 6A.

FIG. 6A illustrates an exemplary isometric view of a multi-fuel adapter according to an embodiment of the invention. FIG. 6B illustrates an exemplary front view of the multi-fuel adapter according to FIG. 6A. FIG. 6C illustrates an exemplary cross-sectional view of FIG. 6B along line A to A'. FIG. 6D illustrates an exemplary bottom view of the multi-fuel adapter according to FIG. 6A. FIG. 6E illustrates an exemplary top view of the multi-fuel adapter according to FIG. 6A.

Referring to FIG. 6A-6E, the multi-fuel adapter is generally depicted with reference to 600. The multi-fuel adapter 600 is utilized to convert the cutting torch system 100 or other cutting torch systems, e.g., cutting torch systems described in U.S. Pat. Nos. 3,182,334; 3,192,987; and 5,379,930, each of which are hereby incorporated by reference as if fully set forth herein, to be operable with any type of liquid fuel as described herein.

The multi-fuel adapter 600 includes a main body 602, neck 604 and head 606. The main body 602, neck 604 and head 606 include a brass material, e.g., 360 brass. The main body mass is configured as an efficient thermal coupler to draw heat through the cutting tip to pre-heat the multi-fuel using only return heat energy of a flame during operation of the cutting system. In this embodiment, the main body 602 further includes heat catch features 606 configured to increase the rate of heat transfer from the pre-heat flame to the multi-fuel adapter. The heat catch feature may include one or more heat catch features, e.g., a series of equally spaced concentric holes around a bottom surface of the multi-fuel adapter 600. The holes may be about 0.01 inches deep to about 0.3 inches deep. Other geometric configurations and/or materials may also be used as the heat catch features, e.g., square configuration, a concentric slot extending in a range from about 5 degrees around the surface to 360 degrees around the surface, etc. In this embodiment, the main body 602 has a mass less than the main body 202, main body 302, main body 402, or main body 502.

A recess 608 is formed on neck portion 604 and configured to receive a split ring (not shown), e.g., a stainless steel ring. The split ring (not shown) can be formed as a c-ring and is configured to prevent a sealing nut (not shown) from falling off the neck 604. The sealing nut 152 is used to pull the neck into the cutting head 122, thereby securing the multi-fuel adapter 600 to the cutting head 122. In one embodiment, there is a large amount of force required to secure the multi-fuel adapter 600 to the cutting head 122. The amount of force is in a range from about 3000 psi to about 5200 psi or greater, in a preferred embodiment there is about 4500 psi.

Four equally spaced ports or orifices 612 are arranged in the tip portion. Each port 612 extends as a channel via a lumen from the tip 606 through the neck 604 and main body 602. The neck 604 extends from the upper most portion of the main body 602 to the bottom of the recess 608. As the length of the neck 604 increases the mixing time of multi-fuel to oxygen is also increased, thereby improving performance. The lumens are configured in a circular geometrical configuration. The lumens are configured in fluid communication with the orifices on the cutting tip (not shown) and in fluid communication with orifices on a cutting torch head 122. The lumens are used to provide a oxy fuel pre-heat fuel mixture. A channel 614 is used a high pressure oxygen channel and extends via a lumen from the tip 606 through the neck 604 and main body 602.

An end portion of the tip 606 includes a first taper region 613 and second taper region 618 configured as a male adapter. This first taper region 613 and second taper region 618 are configured to fit into a substantially mirror image of a female adapter mixing body 151 that is arranged in the cutting torch head 122. In this embodiment, the recess 608 is spaced a distance 611 from the end of the first taper region 613; the distance is about 0.32 inches. This distance is about three times longer than the distance 611 of the multi-fuel adapter 600. This increase in distance is believed to allow the nut to provide all the necessary force to seal the multi-fuel adapter face and the mixing body without distortion of the seating or sealing surfaces. The main body 602 has a mass less than the mass of the main body 202, main body 302, main body 402, and main body 502. In this embodiment, there is a recess 615 in the main body 602. The recess 615 is configured to receive a wrench for tightening the multi-fuel adapter 600 and cutting tip nut as described herein.

Figures 7A, 7B:
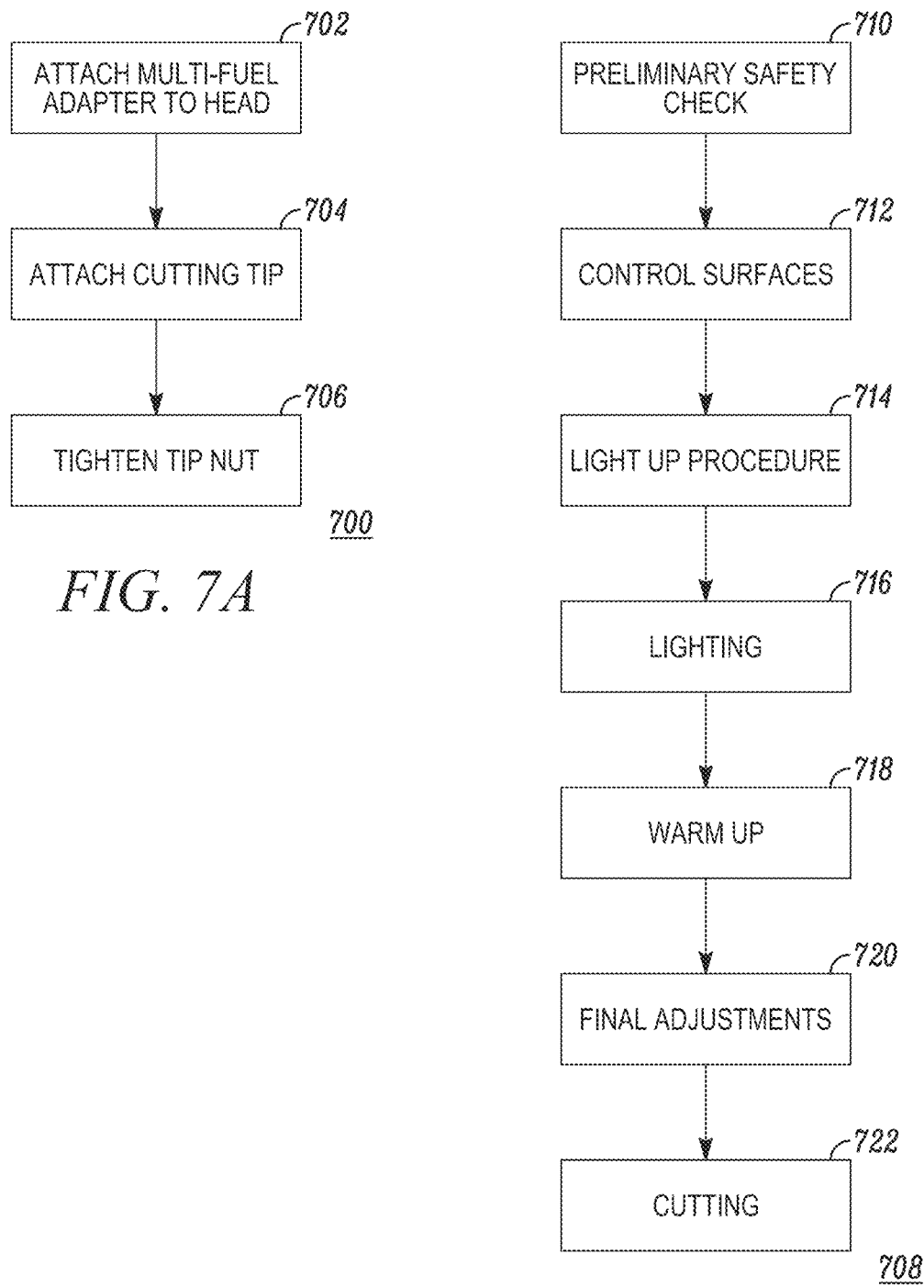
FIG. 7A illustrates a method for installing a multi-fuel adapter assembly according to an embodiment of the invention.
FIG. 7B illustrates a method for lighting a multi-fuel cutting torch according to an embodiment of the invention.

FIG. 7A depicts a method for installing a multi-fuel adapter assembly according to an embodiment of the invention.

Referring to FIG. 7A, the method of attaching the multi-fuel adapter is generally shown with reference to number 700. The method 700 includes step 702 attaching the multi-fuel adapter 124 to the torch head 122 using a wrench, e.g., adjustable wrench, to snug the adapter nut 152 to the torch head 122. In step 704, a tip nut 126 is slid over a cutting tip assembly 128 and placed into the adapter. Any cutting tip as known in the art may be utilized. In step 706, a multi-fuel adapter 124 installation wrench, e.g., adjustable wrench, is placed over the multi-fuel adapter 124 to stabilize the body, and a second adjustable wrench is used to tighten the tip nut 126 to the multi-fuel adapter 124.

FIG. 7B depicts a method of starting the light up method. Referring to FIG. 7B, the overall process is generally depicted with reference number 708. The method includes an optional preliminary safety check step 710 that includes one or more of checking yourself and team step, checking the environment step and checking the equipment step. The checking yourself and team step includes checking yourself to ensure you are wearing the correct protective equipment for the job and knowing how the material you are cutting reacts to heat. The checking your environment step includes one or more the following: knowing what is beneath, beside and above the cut that one is about to make, aggressively looking for hidden hazards and not cutting into anything you are not sure of. The checking your equipment step includes one or more of the following checking to ensure all fittings are snug, storing and transporting your cutting system safely, e.g., transporting with a carrier, and purging the system by depressing the high pressure oxygen trigger prior to lighting up.

Step 712, the controlling the surfaces step, includes one or more of the following: preparing the spark striker by ensuring that your spark striker is engaging the flint and creating adequate sparks before beginning the light up process. Doing so will prevent excess fuel from being lost. In step 714 the control surfaces step one or more the following occurs: the pre-heat oxygen knob 117 is turned counterclockwise to open the valve and clockwise to close the valve, the high pressure oxygen trigger 116 is depressed to release the flow of high pressure oxygen and released to cease the oxygen flow and the fuel control knob 130 is turned counterclockwise to open the valve and clockwise to close the valve.

Step 714, the light up step, includes one or more of the following: a light up sequence (½ turn-Purge-1 turn), creates a suitable preheat mixture for light up and also helps to protect from oxygen flashback. The pre-heat oxygen knob is opened precisely ½ turn. Optionally, the pre-heat knob 117 includes '+,-' decals to execute a precise turn. In addition, if using a cutting tip sized as a 6, 7, or 8 open ¼ turn. The high pressure oxygen trigger is purged by fully depressing for about 3 to 5 seconds. The fuel control knob is open precisely 1 turn, e.g., using the '+,−' decals to execute a precise turn.

Step 716, lighting the torch step, includes lighting the torch by striking the sparker directly at the tip. Striking sparks too far away will slow or even prevent ignition.

Step 718, the warm up step, includes after ignition, resting the tip directly on the cutting substrate, e.g., steel, at about a 45 degree angle for about 5 to 10 seconds or longer. The reflected heat will bring the tip to its operating temperature allowing the fuel to fully vaporize inside the Tip. Make no flame adjustments during this period. Failing to allow the tip to fully heat will prevent proper flame adjustment. As the tip warms, the yellow and orange in the flame will disappear.

In step 720, optionally final adjustments are made and can include one or more of the following. With the tip still touching the steel, use the fuel control knob to make the final adjustment. When using the recommended light-up setting (½ turn oxygen/½ turn fuel), the preheat flame will be slightly rich. Using the Fuel Control Knob, adjust the flame so that the preheat jets slightly oscillate. The preheat flame should look and sound more aggressive than the flames of compressed gas cutting torches. Running the torch with a rich flame setting is configured to unlock the performance of the system. Running the torch with a lean (wispy) setting can overheat the head, reduce performance and increase maintenance and repair. A rich setting allows more liquid fuel to enter the head of the torch. The natural cooling effect created by the liquid fuel evaporation protects the mixer and tip against overheating. Additionally, the liquid fuel rapidly increases in volume as it expands into a gas, creating a greater oxy/fuel velocity as it leaves the Tip, ultimately driving more BTUs into the steel.

In step 722, cutting is performed by depressing the high pressure oxygen trigger and placing the cutting tip in contact with the surface of the steel that is desired to be cut. Performing clean, fast cuts requires practice. Make the following habits a standard part of cutting operations to greatly increase productivity and reduce the learning curve of the operator. In a preferred embodiment, the operator does one or more of the following: take the time to find a stable, comfortable position, use what's available to rest or stabilize the torch and/or the operators hand, use small, smooth movements, Use one consistent speed of travel throughout the cut, pay extra attention at the beginning of the cut to ensure that the flame has completely penetrated the material before proceeding. If at any time sparks or molten material exits the cut from a direction other than directly from the bottom of the material, examine the area, as the flame may not be fully penetrating the steel. The torch position should be examined by analyzing the precise path the cut will follow before lighting the torch. This path is called the cut line. Identify and mark the cut line with soap stone or chalk. This will result in a smoother and thus faster cut. Position the preheat flame so that half of the flame is on the steel and the other half runs down the leading edge of the steel. Keep the torch perpendicular to the face of the steel while cutting. This directs all of the energy of the preheat flame and high pressure oxygen jet directly into the steel, maximizing cutting efficiency and controlling hot material as it exits the cut.

In an embodiment of the system with the multi-fuel adapter a v-cut method can be used. The v-cut is a very subtle technique used to grab added steel from the top most layer of a stack to fuel the layers beneath. This added back and forth "V" motion is useful in situations when there is a significant buildup of debris between layers or there is difficulty achieving penetration through all layers.

In an embodiment of the system with the multi-fuel adapter a hole punching method can be used. The hole punching method includes placing the preheat flame in the location of the desired hole. Maintain about a ¼ inch coupling distance and watch beneath the preheat flame for a molten puddle to form. Once a molten puddle has formed and begins to drip (spider out) perform the following three actions simultaneously. Smoothly engage the high pressure oxygen trigger fully, increase the coupling distance (¼ to ½ inch) and move the torch head (¼ to ½ inch) left, right or back. The movement of the torch head will create a small trench which molten material and expanding gases will follow. The material will travel in the opposite direction of the movement of the torch. For example, to direct the material to the left, move the torch head right. Don't push the torch forward as this will direct the material toward the operator. Once a hole has been pierced through the steel, the operator may enlarge the hole by keeping the high pressure oxygen depressed and moving the torch in an outward spiral. With this technique, little or no popping will occur and the tip will be protected from overheating because the heat is directed away. It is noted that failure to use a proper hole punching technique may result in overheating the head of the torch or melting the tip. Indications that this has occurred include: the tip nut becoming loose, and leaking around the tip nut due to melted o-rings on the mixer body.

In an embodiment, the system with the multi-fuel adapter can be used for cutting layers. In this method, the layers are exposed, preheat the cut line and down the side of the material where the cut will be initiated before beginning the cut. If the layers are not exposed, begin by punching a hole. Once the top-most layer becomes molten, depress the high pressure oxygen trigger smoothly and fully, allowing the heat generated from the top layers to ignite the bottom layers before moving deeper into the cut. When proceeding into the cut, executing the small, controlled 'V' pattern will make penetrating the bottom layers much easier. Once through all layers, proceed with the cut normally, using the 'V-Cut' technique whenever needed. Watch the material as it leaves the bottom of the cut. If it does not exit directly from the bottom, as it would when cutting a solid piece, then the cut is probably not penetrating all of the layers. In a preferred embodiment, when cutting layers, it is generally preferred to increase one tip size over the cutting chart recommendation for the solid equivalent of the cut thickness.

In an embodiment of the invention the system with the multi-fuel adapter can be used for cutting gaps. The method uses the same techniques described in layer cutting. Preheat the cut line and down the side of the material where the cut will be initiated before beginning the cut. Once the top-most surface becomes molten, depress the high pressure oxygen trigger while maintaining this position until the heat from the burning of the top layers has passed through the air gap and ignited the layer(s) below. As you move into the cut, make the "V" motion to increase the heat of the cut. Watch the material as it leaves the bottom of the cut. If the material does not exit directly from the bottom as it would when cutting a solid piece, then the cut is probably not penetrating all of the layers.

In another embodiment, the system with the multi-fuel adapter can be used with a drive technique. If there is a significant buildup of debris between the layers or there is difficulty achieving penetration through all layers, it may be necessary to increase the forward speed of the cut and increase the size of the 'V' until complete penetration is achieved. This technique will increase the heat significantly, allowing for deeper penetration. Note that there may be uncut layers at the start of the cut when using this technique.

Figure 8A:
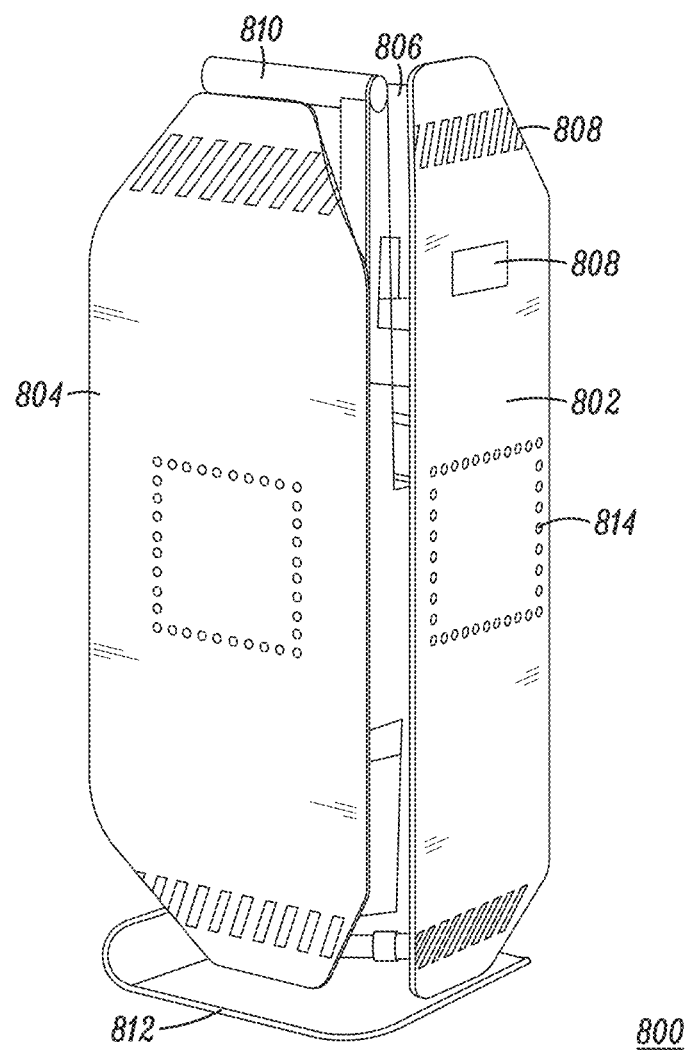
FIG. 8A illustrates an exemplary isometric view of a cutting torch system and carrier according to an embodiment of the invention.
Figure 8B:
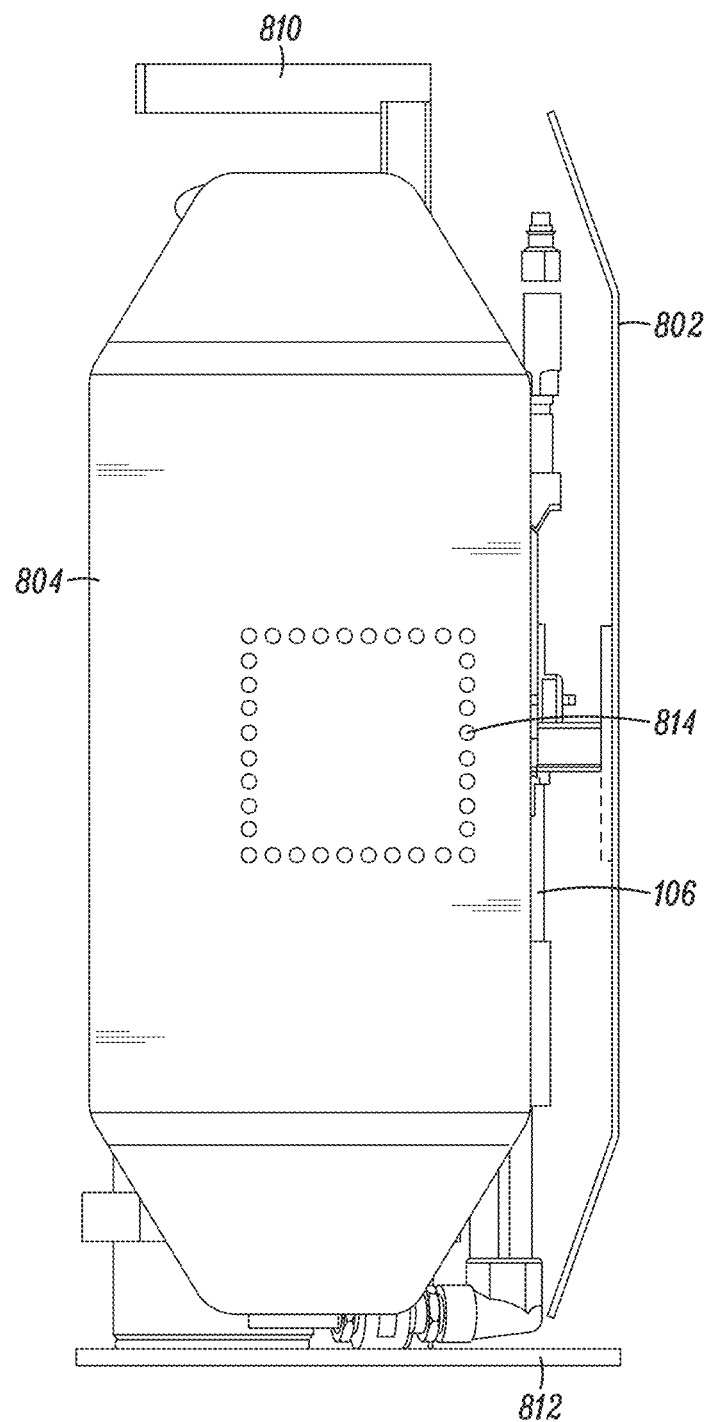
FIG. 8B illustrates an exemplary side view of the cutting torch system of FIG. 8A.
Figure 8C:
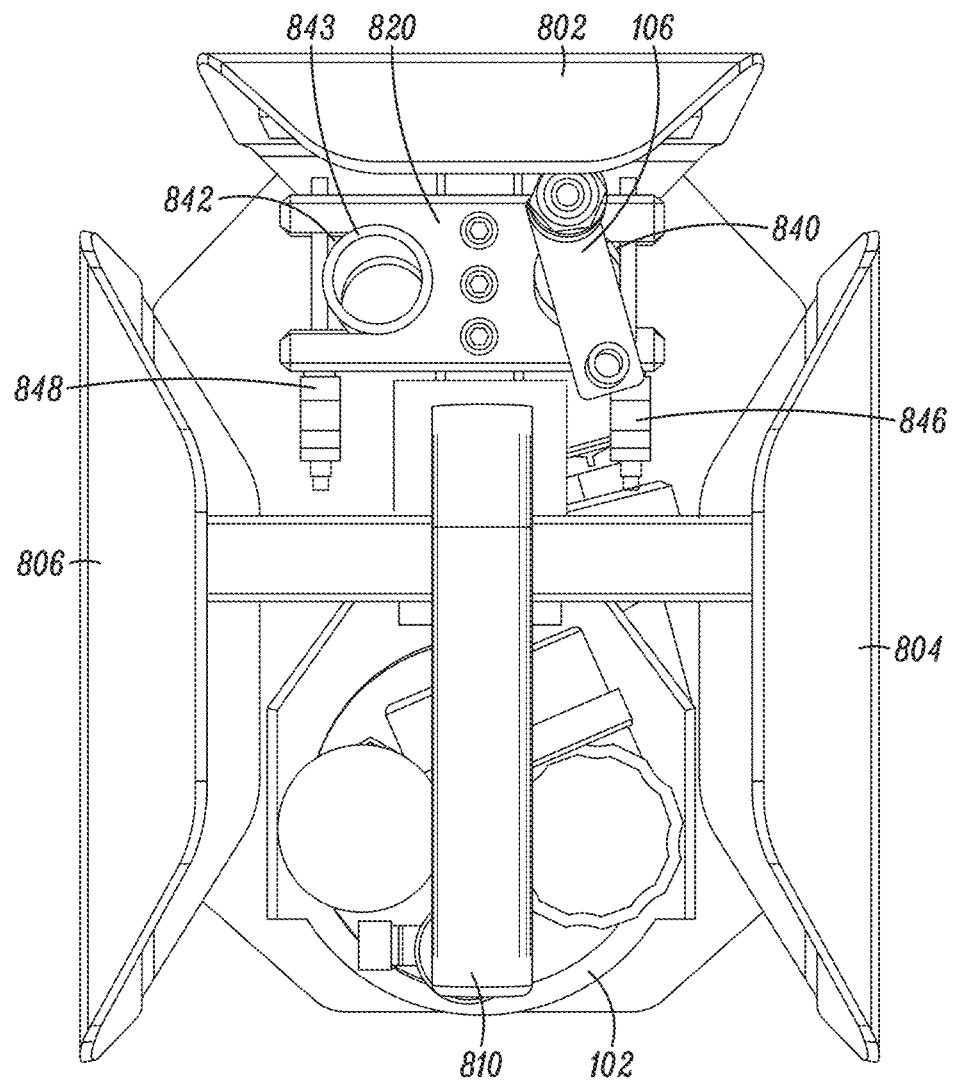
FIG. 8C illustrates an exemplary top view of the cutting torch system of FIG. 8A.
Figure 8D:
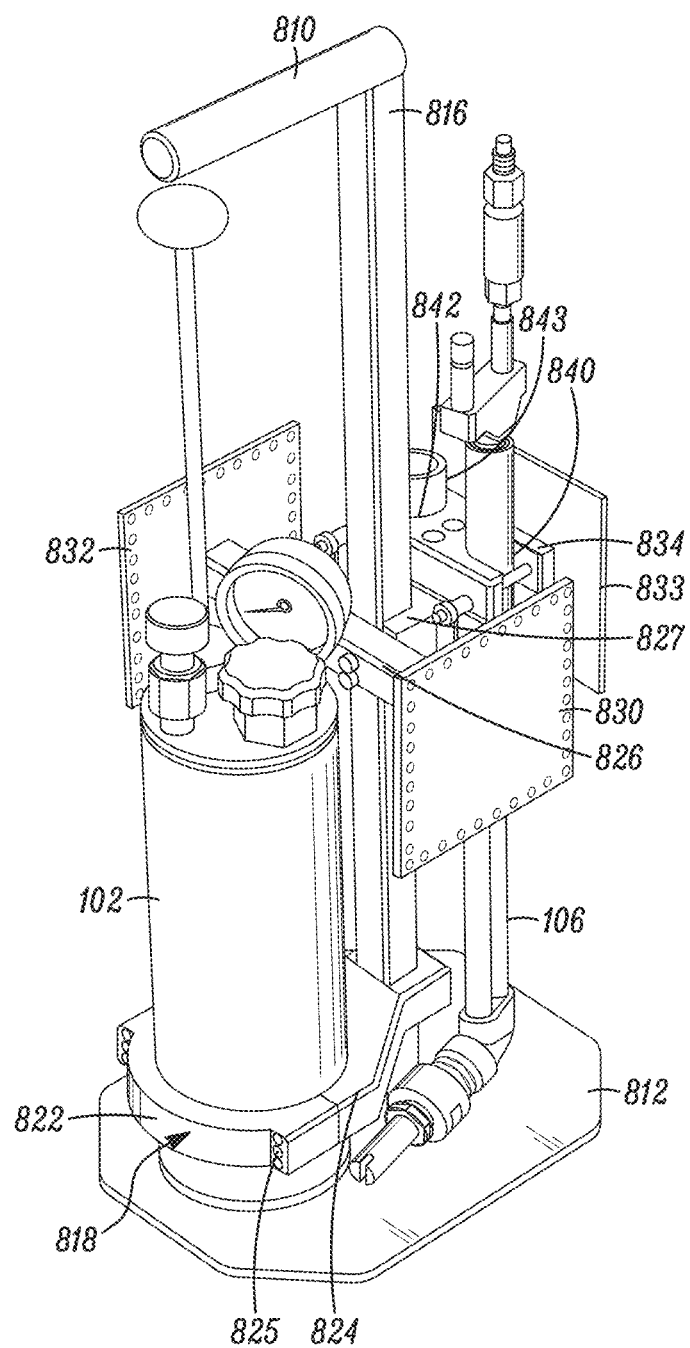
FIG. 8D illustrates an exemplary exploded view of the cutting torch system of FIG. 8A with components.
Figure 8E:
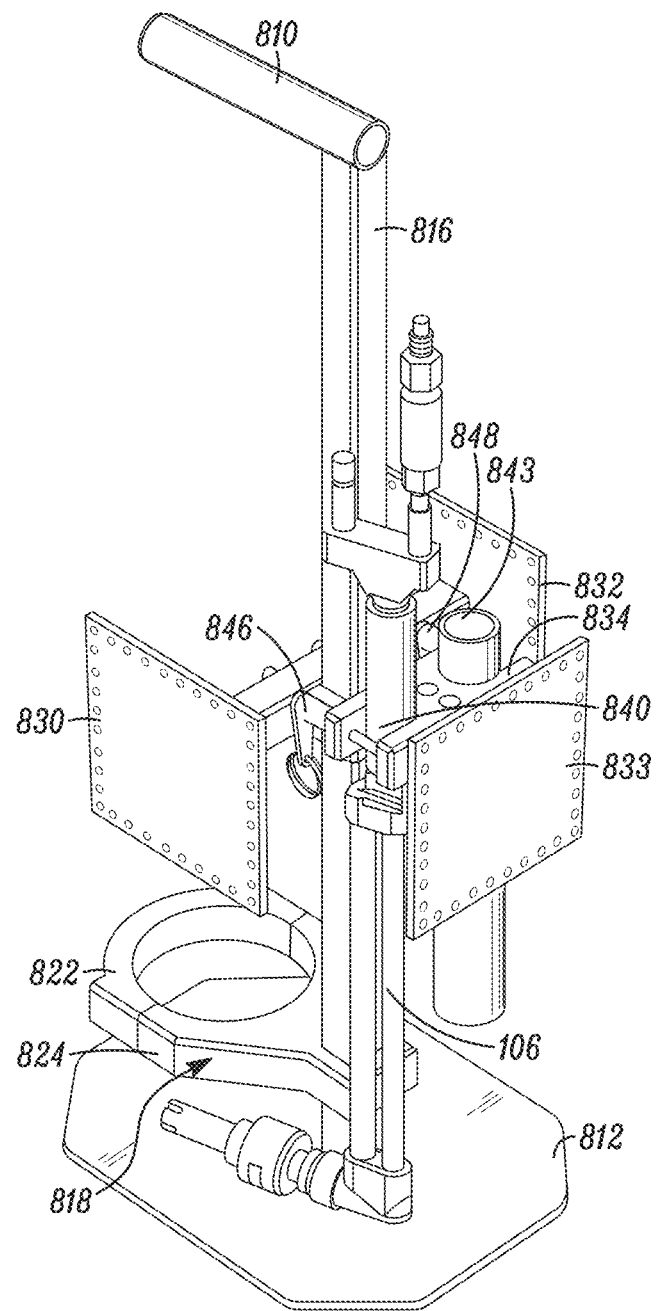
FIG. 8E illustrates an exemplary exploded view of the cutting torch system of FIG. 8A with components.

FIG. 8A illustrates an exemplary isometric view of a cutting torch system carrier according to an embodiment of the invention. FIG. 8B illustrates an exemplary side view of the cutting torch system of FIG. 8A. FIG. 8C illustrates an exemplary top view of the cutting torch system of FIG. 8A. FIG. 8D illustrates an exemplary exploded view of the cutting torch system of FIG. 8A with components. FIG. 8E illustrates an exemplary exploded view of the cutting torch system of FIG. 8A with components.

Referring to FIGS. 8A-8E, the cutting torch system is dimensioned to fit within the carrier 800. The carrier 800 includes a first protective siding 802, a second protective siding 804 and a third protective siding 806. The protective siding in this embodiment includes aluminum material. The protective siding can include one or more logos, designs 808 and/or combinations of the same. In one embodiment, the protective siding is configured to reduce fuel mist or spray mist to safeguard an operator for air fuel emission and/or confine mist to the interior of the carrier, e.g., with the sizing and/or shape of the protective siding. In one embodiment, the protective siding includes bullet proof or resistant materials, e.g., materials or combination of materials configured to stop a bullet or similar high velocity projectiles, e.g., shrapnel such as metals, combination of metals, composites, Kevlar, and the like. Optionally and/or alternatively, there can be either one, two or three protective sides. In another embodiment, there is no protective siding. There does not need to be a gap on the protective sides and the sides can be solid material that partially or fully surrounds the components. The protective sides may be integral with the carrier or held on with one or more attachment mechanisms 814, e.g., rivets, screws and bolts, welds, combinations of the same and the like. The carrier also includes a handle 810 and a base 812. The base 812 is configured to allow the carrier to stand up vertically and may also be configured to prevent tipping with anti-tipping mechanism.

In one embodiment, the carrier 800 is configured to carrier all of the components of the cutting system 100 except the oxygen tank 104. In another embodiment, the components include a cutting torch 106, an oxygen hose 110, a multi-fuel hose 108, an igniter 843, a cutting tip 128, and a liquid tank 102. In another embodiment, the components include a cutting torch 106, an igniter 843, a cutting tip 128, and a liquid tank 102. Of course, any combination of components can be used in the carrier 800. Each of these components are secured in the carrier system 800 with one or more securing mechanisms.

Referring now to FIGS. 8C, 8D and 8E, the carrier 800 includes a vertical bracket 816 extending from the base 812, a first vertically adjustable securing bracket 818 for securing the liquid tank 102 and a second vertically adjustable securing bracket 820. The first vertically adjustable securing bracket 818 is configured to releasably move vertically up and down along the vertical bracket 816 and configured to secure the liquid fuel tank 102. The first vertically adjustable securing bracket 818 includes a first removable piece 822 releasably coupled to a second removable piece 824 with a series of securing mechanisms 825, e.g., screws. The second bracket 824 is releasable coupled to the vertical bracket 816 and configured to move up and down.

In this embodiment, a horizontal bracket 826 is releasably coupled to the vertical bracket 816 with a series of securing mechanisms, e.g., clamp mechanism. The horizontal bracket 816 terminates on opposite sides with a first plate 830 and second plate 832 that are configured to receive protective siding 804 and protective siding 806. In addition, another horizontal bracket 827 extends at about 90 degrees relative to the horizontal bracket 826 and terminates with a third plate 833 configured to receive protective siding 802. In this embodiment, protective siding 802 is releasably coupled to the plate 833 with a securing mechanism, protective siding 804 is releasably coupled to plate 830 and the protective siding 806 is coupled to plate 832.

The carrier 800 also includes a second vertically adjustable securing bracket 834 having a first recess 840 for securing the cutting torch 106 and a second recess 842 an igniter 843 for lighting the cutting torch 106. The recess 840 includes one or more quick release pins 846 for securing the cutting torch 106. The recess 842 includes one or more quick release pins 848 for securing the igniter 844. In this embodiment, the quick release pins are spring loaded locking pins as known in the art. Optionally, a cabling system is further integrated in the interior of the carrier and configured to secure the oxygen hose and/or multi-fuel hose. The cabling system may one described with reference to U.S. Pat. No. 4,253,716, which is hereby incorporated by reference as if forth herein. By way of example, the bottom may include a circular cable management system for receiver the oxygen and/or multi-fuel hose in a recessed slot. In another embodiment, the cabling system may be a hose reel. In another embodiment, the carrier system 300 includes wheels. In another embodiment, the carrier system 300 includes a vehicle mounting kit to couple the carrier 300 to a vehicle.

EXAMPLES

Without intending to limit the scope of the invention, the following examples illustrate how various embodiments of the invention may be made and/or used.

Example 1

Figure 2F:
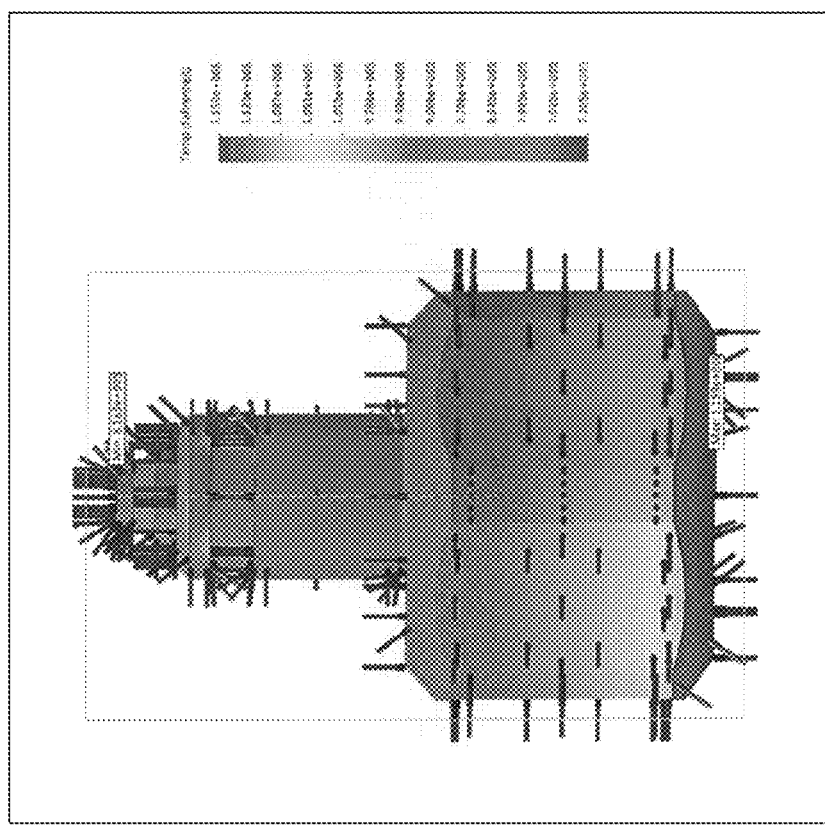
FIG. 2F illustrates a thermal profile of 120 seconds according to Example 1.

FIG. 2F illustrates a thermal profile of 120 seconds according to Example 1. This Example 1 illustrates a computer simulation that accurately describes the real world performance of heat gain based on a pre-heat flame for a 120 second duration with the multi-fuel adapter 200 as described in FIGS. 2A-2E. The computer simulation was run using Solid works flow simulation professional 2013. The computer simulation uses a heat power of 250 BTUs applied directly to the bottom most portion or face of the multi-fuel adapter 200 for 120 seconds with a time step of 1/20. As shown the temperature profile is the temperature after 120 seconds of applied heat. The temperature scale is in Fahrenheit and ranges from 72.6° F. to 115.9° F. degrees. As shown, due to the large mass of the main body the head and neck portion of the multi-fuel adapter did not substantially increase in heat during the 120 seconds. In addition, the temperature gradient from the head, tip and body is large indicating non-uniform temperature. The bars on FIG. 2F indicate the initial temperature of 72.6° F. on each of the shown surfaces.

Example 2

Figure 4F:
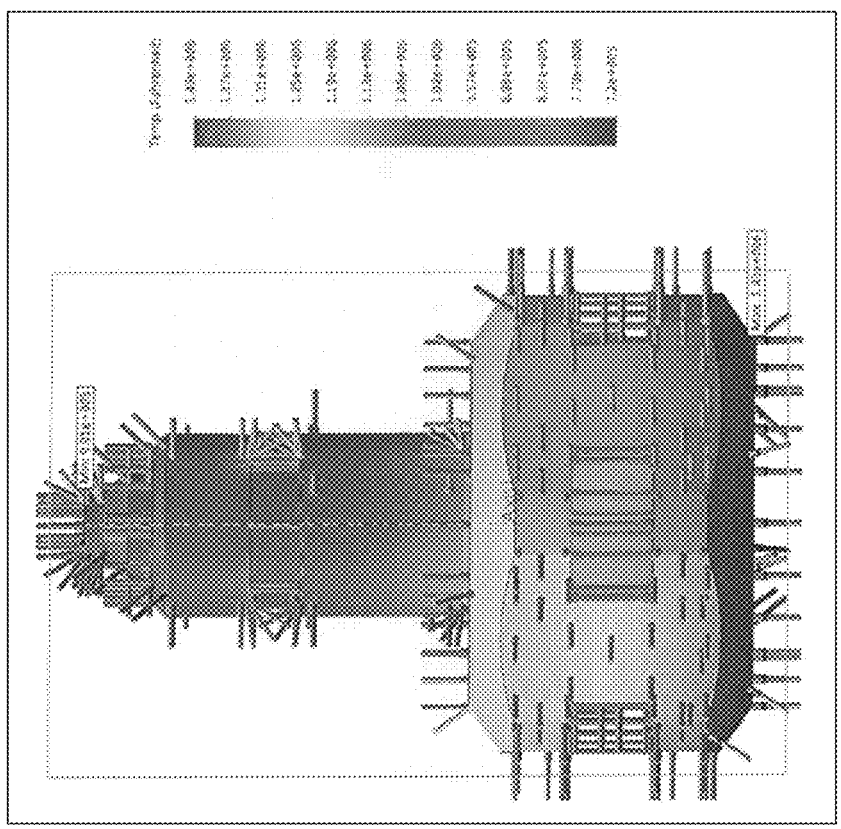
FIG. 4F illustrates a thermal profile of 120 seconds according to Example 2.

FIG. 4F illustrates a thermal profile of 120 seconds according to Example 2. This Example 2 illustrates a computer simulation that accurately describes the real world performance of heat gain based on a pre-heat flame for a 120 second duration with the multi-fuel adapter 400 as described in FIGS. 4A-4E. The computer simulation was run using Solid works flow simulation professional 2013. The computer simulation uses a heat power of 250 BTUs applied directly to the bottom most portion or face of the multi-fuel adapter 400 for 120 seconds with a time step of 1/20. As shown the temperature profile is the temperature after 120 seconds of applied heat. The temperature scale is in Fahrenheit and ranges from 72.0° F. to 143.0° F. degrees. As shown, due to the smaller mass of the main body as compared to Example 1 the head and neck portion of the multi-fuel adapter did increase more in heat during the 120 seconds. In addition, the temperature gradient from the head, tip and body is smaller as compared to Example 1 indicating a more uniform temperature. The bars on FIG. 4F indicate the initial temperature of 72.0° F. on each of the shown surfaces.

Example 3

Figure 5F:
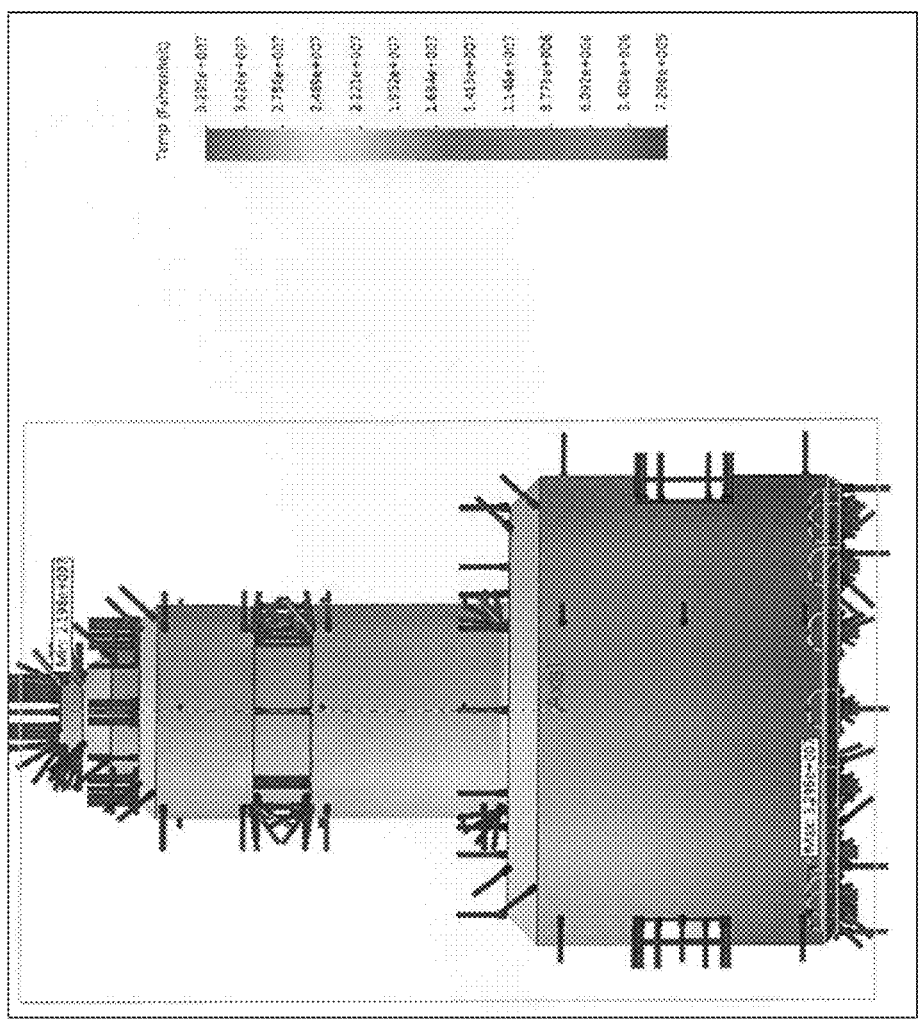
FIG. 5F illustrates a thermal profile of 120 seconds according to Example 3.

FIG. 5F illustrates a thermal profile of 120 seconds according to Example 3. This Example 3 illustrates a computer simulation that accurately describes the real world performance of heat gain based on a pre-heat flame for a 120 second duration with the multi-fuel adapter 500 as described in FIGS. 5A-5E. The computer simulation was run using Solid works flow simulation professional 2013. The computer simulation uses a heat power of 250 BTUs applied directly to the bottom most portion or face of the multi-fuel adapter 500 for 120 seconds with a time step of 1/20. As shown the temperature profile is the temperature at after 120 seconds of applied heat. The temperature scale is in Fahrenheit and ranges from 72.0° F. to 329.5° F. degrees. As shown, due to the smaller mass of the main body as compared to either Example 1 or 2 the head and neck portion of the multi-fuel adapter did increase more in heat during the 120 seconds. In addition, the temperature gradient from the head, tip and body is smaller as compared to either Example 1 or 2 indicating a more uniform temperature. The bars on FIG. 5F indicate the initial temperature of 72.0° F. on each of the shown surfaces.

Example 4

Figure 6F:
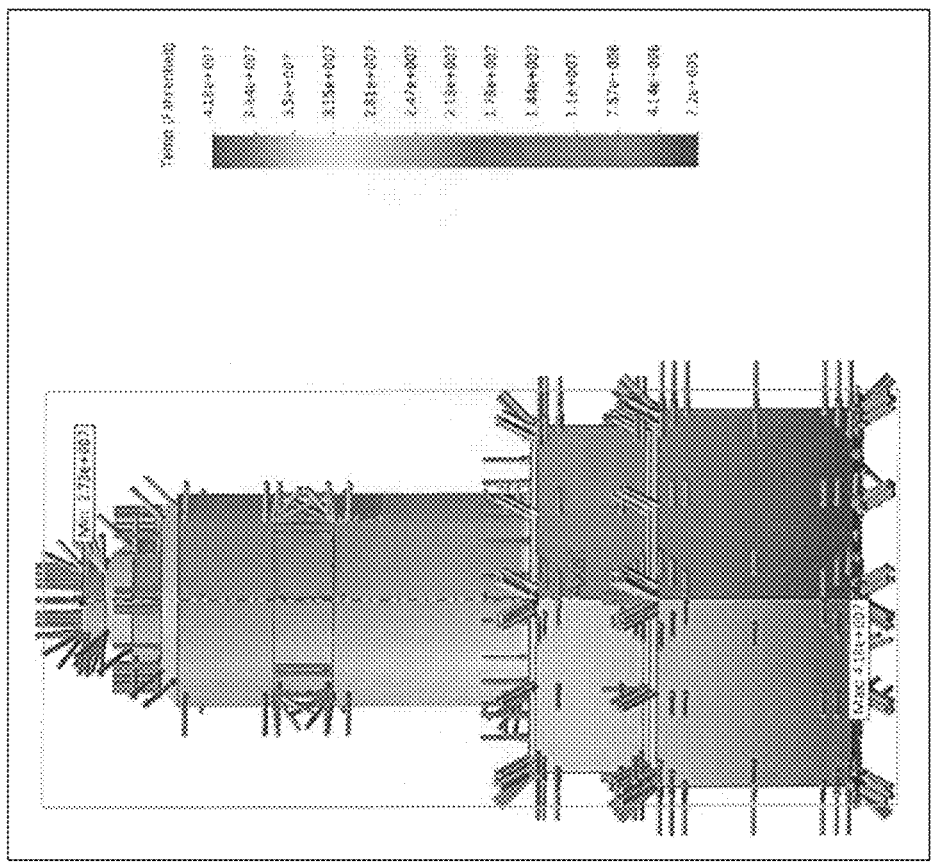
FIG. 6F illustrates a thermal profile of 120 seconds according to Example 4.

FIG. 6F illustrates a thermal profile of 120 seconds according to Example 4. This Example 4 illustrates a computer simulation that accurately describes the real world performance of heat gain based on a pre-heat flame for a 120 second duration with the multi-fuel adapter 600 as described in FIGS. 6A-6E. The computer simulation was run using Solid works flow simulation professional 2013. The computer simulation uses a heat power of 250 BTUs applied directly to the bottom most portion or face of the multi-fuel adapter 600 for 120 seconds with a time step of 1/20. As shown the temperature profile is the temperature after 120 seconds of applied heat. The temperature scale is in Fahrenheit and ranges from 72.0° F. to 418.0° F. degrees. As shown, due to the smaller mass of the main body as compared to either Example 1, 2, or 3 the head and neck portion of the multi-fuel adapter did increase more in heat during the 120 seconds. In addition, the temperature gradient from the head, tip and body is smaller as compared to either Example 1, 2, or 3 indicating a more uniform temperature. The bars on FIG. 6F indicate the initial temperature of 72.0° F. on each of the shown surfaces.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of converting a conventional gasoline oxygen cutting torch to a multi-fuel cutting torch, comprising:
   obtaining a conventional gasoline oxygen cutting torch including a head, a body and a base;
   attaching a multi-fuel adapter to the head of the conventional gasoline oxygen cutting torch, wherein the multi-fuel adapter comprises a main body, a neck extending from the main body, a head extending from the neck, and one or more heat catches including a plurality of holes in a surface of the main body;
   obtaining a cutting tip; and
   attaching the cutting tip to the multi-fuel adapter.

2. The method of claim 1, wherein the multi-fuel adapter is configured to allow operation with a multi-fuel selected from the group consisting of diesel, biodiesel, kerosene, Jet-A, JP-8, JP-5, JP-24 and combinations of the same.

3. The method of claim 1, wherein the multi-fuel adapter is configured to allow operation with a heavy fuel that is denser than gasoline.

4. The method of claim 1, wherein the multi-fuel adapter is configured as an efficient thermal coupler to draw heat through the cutting tip to pre-heat the multi-fuel adapter using only return heat energy of a flame during operation of the cutting torch.

5. The method of claim 1, wherein the one or more heat catches further comprises a channel arranged in a bottom surface of the multi-fuel adapter.

6. A method of using a cutting torch, comprising:
  obtaining the cutting torch including a head, a body and a base, wherein the head includes a recess;
  obtaining a mixer body having a first end and a second end, wherein the second end has a taper;
  arranging the second end of the mixer body in the recess of the head;
  obtaining a multi-fuel adapter including a main body, a neck extending from the main body, and a head extending from the neck, wherein the neck;
  attaching the multi-fuel adapter to the head of the cutting torch, wherein the head of the multi-fuel adapter is arranged in the first end of the mixer body;
  obtaining a cutting tip having a first end and second end; and
  attaching the first end of the cutting tip to the main body of the multi-fuel adapter,
wherein the multi-fuel adapter comprises a heat catch configured as an efficient thermal coupler to draw heat through the cutting tip to pre-heat the multi-fuel adapter using only return heat energy of a flame during operation of the cutting torch.

7. The method of claim 6, wherein the main body comprises a recess configured to receive a wrench.

8. The method of claim 6, wherein the multi-fuel adapter comprises a brass material.

9. The method of claim 6, wherein the neck comprises a recess extending circumferentially around the neck.

10. The method of claim 6, wherein the main body has an outer circumference that is greater than an outer circumference of the neck.

11. The method of claim 6, wherein the main body comprises a plurality of holes in a surface of the main body.

12. A method of using a cutting torch with a liquid fuel, comprising:
  obtaining the cutting torch including a head and a body;
  obtaining a multi-fuel adapter comprising a main body, a neck extending from the main body, and one or more recesses in a surface of the main body of the multi-fuel adapter;
  attaching the multi-fuel adapter to the head of the cutting torch; and
  attaching a cutting tip to the multi-fuel adapter, wherein the multi-fuel adapter comprises a heat catch configured as an efficient thermal coupler to draw heat through the cutting tip to pre-heat the multi-fuel adapter, using only return heat energy of a flame during operation of the cutting torch.

13. The method of claim 12, wherein the main body has an outer circumference that is greater than an outer circumference of the neck.

14. The method of claim 12, wherein the multi-fuel adapter comprises a brass material.

15. The method of claim 12, wherein the multi-fuel adapter is configured to allow operation with one of a diesel fuel, a biodiesel fuel, a kerosene fuel, a jet-A fuel, a JP-8 fuel, a JP-5 fuel, and a JP-24 fuel.

16. The method of claim 12, wherein the main body comprises a recess configured to receive a wrench.

17. The method of claim 12, wherein the neck comprises a recess arranged circumferentially around the neck.

\* \* \* \* \*